United States Patent
Yasui et al.

(10) Patent No.: US 7,600,762 B2
(45) Date of Patent: Oct. 13, 2009

(54) SUSPENSION CONTROL DEVICE

(75) Inventors: Yoshiyuki Yasui, Nagoya (JP); Hiroaki Kato, Hekinan (JP); Yuji Muragishi, Nagoya (JP); Eiichi Ono, Toyota (JP); Hiroaki Aizawa, Anjo (JP)

(73) Assignees: Aisin Seiki Kabushiki Kaisha, Kariya-Shi, Aichi-Ken (JP); Advices Co., Ltd., Kariya, Aichi (JP); Jtekt Corporation, Chuo-Ku, Osaka (JP)

( * ) Notice: Subject to any disclaimer, the term of this patent is extended or adjusted under 35 U.S.C. 154(b) by 424 days.

(21) Appl. No.: 10/947,370

(22) Filed: Sep. 23, 2004

(65) Prior Publication Data
US 2005/0067213 A1 Mar. 31, 2005

(30) Foreign Application Priority Data
Sep. 26, 2003 (JP) .............................. 2003-334695

(51) Int. Cl.
B60G 17/04 (2006.01)
B60G 21/073 (2006.01)

(52) U.S. Cl. ............... 280/5.51; 280/5.501; 280/5.512; 701/38

(58) Field of Classification Search ............. 280/5.502, 280/5.51, 5.512, 5.508; 180/197, 402, 412, 180/413; 701/37, 38
See application file for complete search history.

(56) References Cited

U.S. PATENT DOCUMENTS

| | | | | | |
|---|---|---|---|---|---|
| 4,882,693 | A | * | 11/1989 | Yopp | 701/37 |
| 5,513,907 | A | * | 5/1996 | Kiencke et al. | 303/150 |
| 5,640,324 | A | * | 6/1997 | Inagaki | 701/70 |
| 5,710,705 | A | * | 1/1998 | Eckert | 701/83 |
| 5,742,917 | A | * | 4/1998 | Matsuno | 701/69 |
| 5,762,157 | A | * | 6/1998 | Uehara | 180/197 |
| 5,822,709 | A | * | 10/1998 | Fujita | 701/70 |
| 6,604,036 | B2 | * | 8/2003 | Pallot | 701/48 |
| 6,622,813 | B2 | * | 9/2003 | Matz et al. | 180/411 |
| 6,895,317 | B2 | | 5/2005 | Yasui et al. | |
| 6,931,313 | B2 | * | 8/2005 | Kato et al. | 701/41 |

(Continued)

FOREIGN PATENT DOCUMENTS

EP 0 236 947 9/1987

(Continued)

OTHER PUBLICATIONS

Y. Muragishi et al., "Estimation of Grip State Based on Self Aligning Torque and Its Application to Enhance Vehicle Stability", Society of Automotive Engineers of Japan, Inc., May 22, 2003, pp. 4.

(Continued)

Primary Examiner—Paul N. Dickson
Assistant Examiner—George D. Spisich
(74) Attorney, Agent, or Firm—Buchanan Ingersoll & Rooney PC

(57) ABSTRACT

A suspension control device includes a wheel grip state estimation device for estimating grip state of vehicle wheels based on variations of aligning torque of wheels to be steered, a vehicle rolling control device for controlling vehicle rolling, and a control parameter setting device for setting a control parameter of the vehicle rolling control device based on at least estimated grip state of the wheel grip state estimation device.

21 Claims, 23 Drawing Sheets

U.S. PATENT DOCUMENTS

2002/0035871 A1* 3/2002 Pallot .......................... 73/489
2005/0055149 A1* 3/2005 Kato et al. .................... 701/80

FOREIGN PATENT DOCUMENTS

| EP | 0 310 094 | 4/1989 |
| JP | 60-029317 A | 2/1985 |
| JP | 01 009011 | 1/1989 |
| JP | 5-185815 | 7/1993 |
| JP | 05 238222 | 9/1993 |
| JP | 6-221968 A | 8/1994 |
| JP | 7-329808 | 12/1995 |
| JP | 10-310074 A | 11/1998 |
| JP | 3163742 | 3/2001 |
| JP | 2001-191937 | 7/2001 |
| WO | 03/059680 A1 | 7/2003 |

OTHER PUBLICATIONS

T. Gillespie; "Fundamentals of Vehicle Dynamics", 1992, pp. 406-407.
European Search Report dated Feb. 11, 2005.
Chinese Office Action dated Nov. 2006.
First Official Letter issued in Japanese Patent Application No. 2003-334695, Feb. 17, 2009, JPO, JP, and English Translation.

* cited by examiner

SUSPENSION CONTROL DEVICE

CROSS REFERENCE TO RELATED APPLICATIONS

This application is based on and claims priority under 35 U.S.C. §119 with respect to Japanese Patent Application No. 2003-334695 filed on Sep. 26, 2003, the entire content of which is incorporated herein by reference.

FIELD OF THE INVENTION

The present invention relates to a suspension control device. More particularly, the present invention pertains to a suspension control device for appropriately controlling the rolling of a vehicle.

BACKGROUND

Known devices for controlling the rolling of the vehicle by controlling each portion of a suspension has been developed in order to improve the handling and stability of the vehicle. For example, a known vehicle control device for controlling a distribution of the roll stiffness of the suspension at front wheels and at rear wheels depending on the level of the coefficient of friction on a road is described in JP3163742B2. The roll stiffness distribution is controlled to improve the driving stability of the vehicle upon the smaller coefficient of friction on the road than at the larger coefficient of friction on the road with the vehicle control device described in JP3163742B2. With the construction of the vehicle control device described in JP3163742B2, the coefficient of friction on the road is estimated in accordance with resultant acceleration G when the operational state of the driver should not reduce the horizontal acceleration. This is based on the premise that the reaching of the resultant acceleration G to the peak value means that the tire is reaching approximate the grip limit and the peak value shows the exact coefficient of friction of the road.

With another known device developed for restraining the rolling at the turning operation of the vehicle, the lateral acceleration of the vehicle is applied as one of the control parameters. The lateral acceleration is obtained by a lateral acceleration sensor, by the calculation based on the vehicle speed, the steering angle, and the all the elements of the vehicle, and by the combinations of the lateral acceleration sensor and the calculation. For example, with the device described in JP05(1993)-185815A2, the control gain of the calculated lateral acceleration (i.e., estimated lateral acceleration) calculated from the actual lateral acceleration, the steering angle, and the vehicle speed is adjusted to improve the initial rolling restraining effect at the sudden steering operation and further to maintain the balance with the control corresponding to the actual lateral acceleration at the super sudden steering operation. Further, whether the traveling road surface is at the low coefficient friction is judged based on the power steering hydraulic pressure adjusted in accordance with the steering reaction force using that the steering reaction force relative to the steering assumes smaller at the road with the low coefficient friction. In case it is judged as at the low coefficient friction, the rolling control amount is corrected to reduce, and thus the control can be securely carried out even at the low coefficient friction.

In the meantime, a parameter showing the degree of the force that tire generates relative to the maximum degree of the force that tire generates with the percentage of allowance to the limit (i.e., referred as the lateral grip margin) is applied to control of the steering system and the braking system to consider the improvement of the performance of the vehicle stability control in "Estimation of Grip State Based on Self Aligning Torque and Its Application to Enhance Vehicle Stability" (Muragishi, Yuji et al. 20035105. Spring Academic Lecture on 22 May 2003 by Society of Automotive Engineers of Japan, Inc.) In other words, using the lateral grip margin, the vehicle stability control can be started from the state that the tire is about to reach the limit region, but yet the allowance is still remained. In Muragishi et al., the estimated result of the lateral grip margin is used for the variable control of the overall steering gear ratio. In the present invention, the lateral grip margin is referred as the wheel grip factor.

In the recent development of the electronic technology, the vehicle operation has been computerized. Steer-by-wire-system has been proposed for the steering control. For example, a steer-by-wire system for changing the steering angle in accordance with the movement of an actuator for the steering by a steering member (steering wheel) without mechanically connecting the steering member to vehicle wheels is described in JP2001-191937A2. A steering control device for controlling the steering angle of the rear wheels by the motor actuation is described in JP07(1995)-329808, which is the steer-by-wire system. With the construction described in Muragishi et al, the lateral grip margin (i.e., the wheel grip factor) is obtained in accordance with the operation of an electric power steering device. Although the electric power steering device is adopted according to the present invention, the wheel grip factor is further easily estimated with the steer-by-wire system.

With the construction described in Muragishi et al, although the coefficient of friction on the road can be judged in case the tire reaches the approximate grip limit, the coefficient of friction of the road cannot be judged otherwise, and, for example, it is necessary to have an countermeasure such as using the last value. In other words, when the tire does not reach the approximate grip limit, the estimation precision of the coefficient of friction on the road declines. Thus, it assumes difficult to follow the changes of the state of the road surface, and the effect of the target roll stiffness distribution control may not be sufficiently obtained.

With the construction described in JP05 (1993)-185815, that the traveling road surface has the low coefficient friction is judged in case the power steering hydraulic pressure adjusted in accordance with the steering reaction force assumes equal to or less than a predetermined value in accordance with the steering angle. Notwithstanding, in case, for example, the characteristics of the tire is changed due to the replacement of the tires from the tires for the summer to the tires for the winter, the wear of the tire, and the secular distortion, which affects the changes of the frictional state between the tire and the road surface, the desired characteristic may not be ensured because the judged state of the low coefficient friction of the road is different from the actual state. Using the lateral grip margin described in Muragishi et al., whether the tire is reaching the friction limit region can be accurately estimated.

A need thus exists for a suspension control device which accurately recognizes the frictional state between the road surface and the tire to carry out the appropriate roll control in accordance with the vehicle state.

SUMMARY OF THE INVENTION

In light of the foregoing, the present invention provides a suspension control device, which includes a wheel grip state estimation means for estimating grip state of vehicle wheels based on variations of aligning torque of wheels to be steered, a vehicle rolling control means for controlling vehicle rolling, and a control parameter setting means for setting a control parameter of the vehicle rolling control means based on at least estimated grip state of the wheel grip state estimation means.

According to another aspect of the present invention, a suspension control device includes a wheel grip state estimation means for estimating state of vehicle wheels based on variations of aligning torque of wheels to be steered, a vehicle roll stiffness control means for controlling vehicle roll stiffness for restraining vehicle rolling, and a control parameter setting means for setting a control parameter of the vehicle roll stiffness control means based on at least estimated grip state of the wheel grip estimation means.

According to further aspect of the present invention, a suspension control device includes a wheel grip state estimation means for estimating state of vehicle wheels based on variations of aligning torque of wheels to be steered, a vehicle roll stiffness distribution control means for controlling vehicle roll stiffness distribution for controlling vehicle steering characteristics, and a control parameter setting means for setting a control parameter of the vehicle roll stiffness distribution control means based on at least estimated grip state of the wheel grip estimation means.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained with reference to the illustrations of drawing figures as follows.

Figure 1:
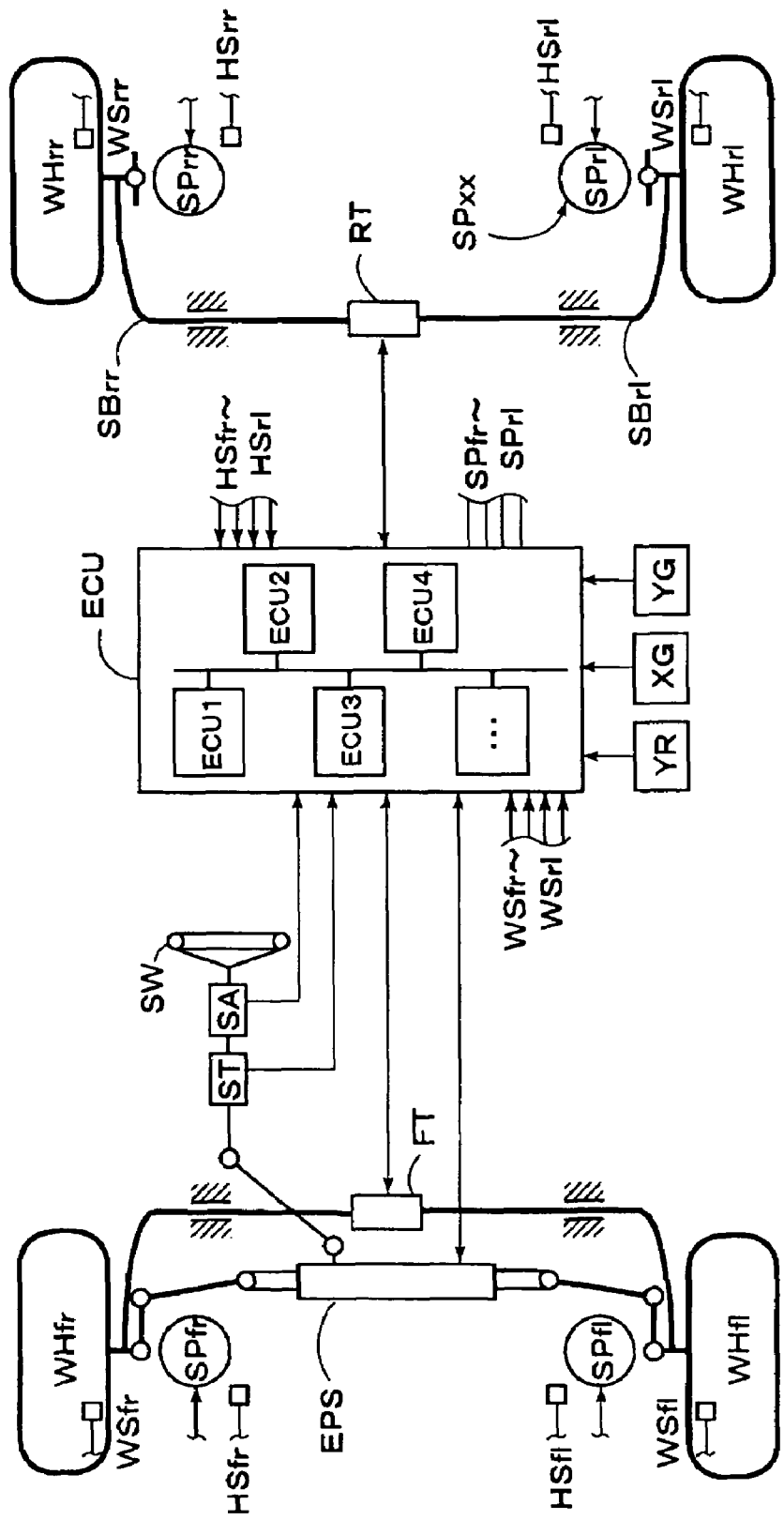
FIG. 1 is a schematic view showing a construction of a suspension control device according to a first embodiment of the present invention.

As shown in FIG. 1, a steering system according to the embodiment of the present invention includes an electric power steering system EPS. The electric power steering system EPS is configured to detect the steering torque Tstr affecting a steering shaft by an operation of a steering wheel SW by an operator with a steering torque sensor ST, to control an electric EPS motor in accordance with the value of the detected steering torque Tstr, and to steer vehicle front wheels WHfl, WHfr via a reduction gear and a rack and pinion to reduce the steering operational force for the operator.

As shown in FIG. 1, each wheel WHxx (i.e., WHfr, WHfl, WHrr, WHrl) (hereinafter, xx indicates each wheel, fr indicates front right wheel, fl indicates front left wheel, rr indicates rear right wheel, and rl indicates rear left wheel.) is provided with a vehicle wheel speed sensor WSxx (i.e., WSfr, WSfl, WSrr, WSrl) which is connected to an electric control unit ECU so that a pulse signal with the pulse number proportional to the rotational speed of each wheel, that is the wheel speed, is inputted to the electric control unit ECU. Further, a steering angle sensor SA for detecting a steering angle δf of a steering wheel SW, longitudinal acceleration sensor XG for detecting a longitudinal acceleration Gx of the vehicle, a lateral acceleration sensor YG for detecting the lateral acceleration Gy of the vehicle, a yaw rate sensor YR for detecting yaw rate Yr of the vehicle, a vehicle height sensor HSxx (i.e., HSfr, HSfl, HSrr, HSrl) for detecting the height of the vehicle from the road surface, and a rotational angle sensor for detecting the rotational angle of an EPS motor, or the like, are connected to the electric motor unit ECU.

The electric control unit ECU includes a steering control unit ECU 1, a braking control unit ECU2, a throttle control unit ECU3, and a report control unit ECU4, or the like. The respective control units ECU 1-4 are connected to a communication bus via communication units including a CPU, a ROM, and a RAM for the communication. Thus, the information necessary for respective control systems can be transmitted from the other control systems.

With the construction of the embodiment of the present invention, the wheel grip factor ε is estimated by using the signal of the electric power steering system EPS. In other words, with the vehicle including the electric power steering system, the EPS motor is controlled in accordance with the value of the steering torque Tstr detected by the steering torque sensor ST to reduce the steering operational force for the operator. In this case, the aligning torque generated at the front wheels serving as the wheels to be steered balances with torque subtracting the frictional elements of the steering system from the sum of the torque outputted from the electric power steering system EPS and the steering torque by the steering operation.

Thus, actual aligning torque Tsaa is obtained as the following formula.

$$Tsaa = Tstr + Teps - Tfrc$$

In this case, the steering torque Tstr is detected by the steering torque sensor ST as the foregoing. The output torque Teps corresponds to the torque outputted by the electric power steering system EPS, and, for example, the output torque Teps is estimated based on a motor electric value because the motor electric current value of the EPS motor and the motor output torque are at a predetermined relationship (i.e., the motor output torque is approximately proportional to the motor electric current value). Tfrc stands for the frictional element of the steering system, that is, the torque element deriving from the friction of the steering system. With the construction of the embodiment of the present invention, the correction is applied by subtracting the torque element Tfrc from the sum of the steering torque Tstr and the output torque Teps (i.e., Tstr+Teps) to obtain the actual aligning torque Tsaa.

The wheel grip factor ε estimated based on the actual aligning torque Tsaa detected as the foregoing will be further explained with reference to the drawing figures including FIG. 16 along with the estimation of the wheel grip factor ε according to a second embodiment for a steer-by-wire front wheel steering control system.

A spring control means SPxx (i.e., SPfr, SPfl, SPrr, SPrl) serving as a vehicle rolling control means is provided at each wheel WHxx and stabilizer control means FT, RT serving as the vehicle rolling control means for controlling the torsional rigidity are provided at a front axis and a rear axis respectively. The vehicle roll angle showing the rolling of the vehicle is retrained by the vehicle rolling control means including the spring control means SPxx and the stabilizer control means FT, RT. Although the spring control means SPxx and the stabilizer control means FT, RT are provided as a vehicle rolling angle control means in the embodiment, one of them may be omitted. In case of not including one of the spring control means SPxx and the stabilizer control means FT, RT, uncontrolled normal means is applied in place of the omitted means. For example, in case only the stabilizer control means FT, RT is provided as the vehicle rolling control means, the suspension control means may be a coil spring.

Figure 2:
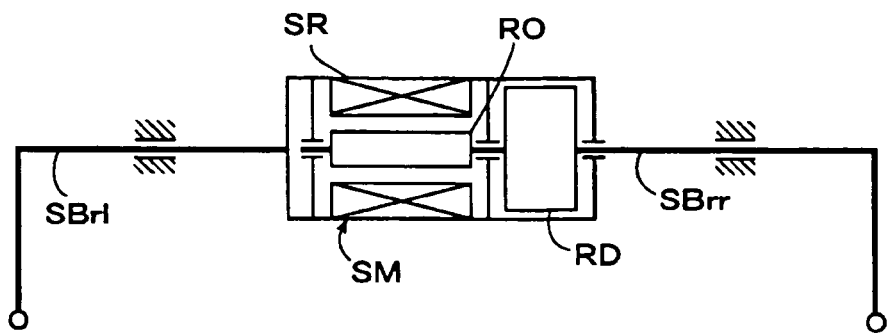
FIG. 2 is a view showing a construction of a stabilizer control means according to the first embodiment of the present invention.

As shown in FIG. 2 showing the construction of the stabilizer control means FT, RT, a stabilizer bar is divided into two portions (e.g., SBrr, SBrl), first ends of respective stabilizer bars are connected to wheels on the right or left respectively, and a second end of one of the respective stabilizer bar is connected to a rotor RO of an electric motor SM via a decelerator RD and the other of the stabilizer bar is connected to a stator SR of the electric motor SM. Thus, when the electric motor SM is energized, the torsion force is generated at the respective stabilizer bars SBrr, SBrl to change the apparent torsion spring characteristics to control the roll stiffness. Although the roll stiffness is controlled by the electric motor SM in the embodiment of the present invention, the power source may be replaced by a pump actuated by a motor or an engine, thus to control the hydraulic pressure by the pump.

Figure 3:
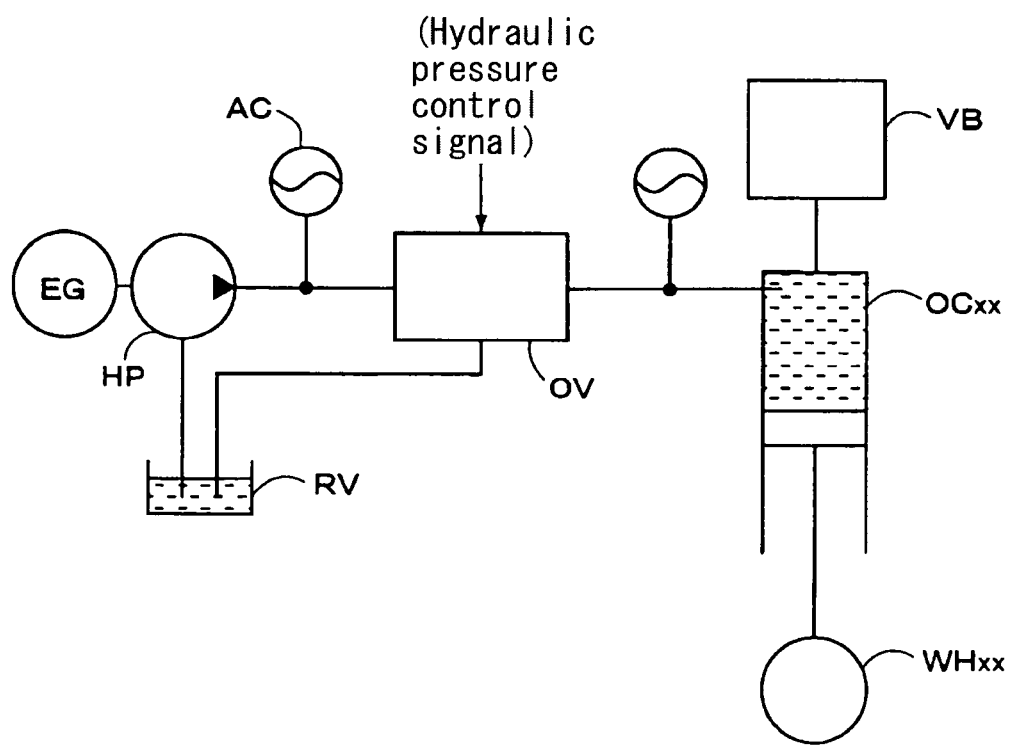
FIG. 3 is a view showing a spring control means according to the first embodiment of the present invention.

FIG. 3 shows the construction of the spring control means SPxx, which is referred as an active suspension. With the construction shown in FIG. 3, a hydraulic cylinder OCxx is provided between each wheel WHxx and a vehicle body VB for controlling the rolling of the vehicle body VB by charging and discharging the hydraulic pressure relative to each hydraulic pressure cylinder OCxx. The hydraulic pressure is charged and discharged by controlling a hydraulic pressure control valve OV. In case the hydraulic pressure is supplied to each hydraulic pressure cylinder OCxx, a pump HP is driven by an engine EG or a motor to supply the hydraulic pressure generated in the pump HP to the hydraulic pressure cylinder OCxx from an accumulator AC via the hydraulic pressure control valve OV. In case the oil is discharged from the hydraulic pressure cylinder OCxx, the oil is discharged to a reservoir RV via the hydraulic pressure control valve OV. Thus, the vehicle rolling is restrained by supplying the hydraulic pressure to the hydraulic pressure cylinder OCxx of one side of the wheels, and by discharging the oil from the hydraulic pressure cylinder OCxx at the wheels of the opposite side relative to the longitudinal direction of the vehicle. Although the oil is used as the power transmission media, the oil serving as the fluid may be replaced by compressed gas compressed by a compressor for controlling the rolling.

Figure 4:
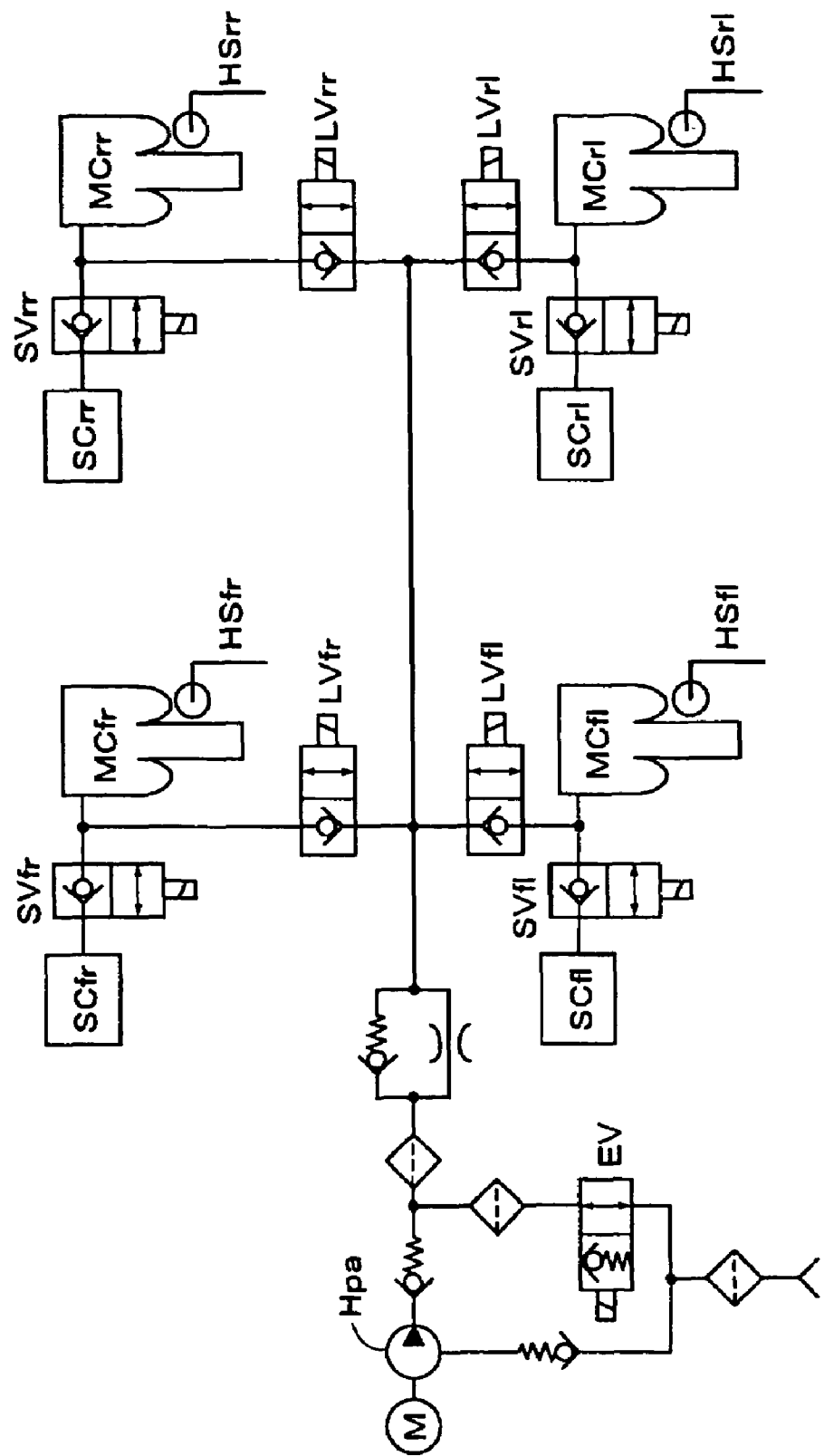
FIG. 4 is a view showing the spring control means according to the first embodiment of the present invention.

FIG. 4 shows an air suspension device for controlling an air spring constant serving as the spring control means SPxx. An air spring device of each wheel WHxx includes a main chamber MCxx, a sub chamber SCxx, a switching valve SVxx for controlling the establishment of the communication between chambers, and a vehicle height adjusting valve LVxx. Because the larger the volume of each chamber, the lower the air spring constant, the volume of each chamber is switched by opening and closing the switching valve SVxx to control the roll stiffness by the greatness of the spring constant. For example, the spring constant is switched from the low state to the high state by switching the switching valves SVfl, SVfr at the front wheels from the open state to the closed state to further increase the roll stiffness at the front wheel side, which unlikely generates the vehicle rolling. A compressor Hpa driven by an electric motor M and a discharge control valve EV are provided to serve as air supply sources.

Figure 5:
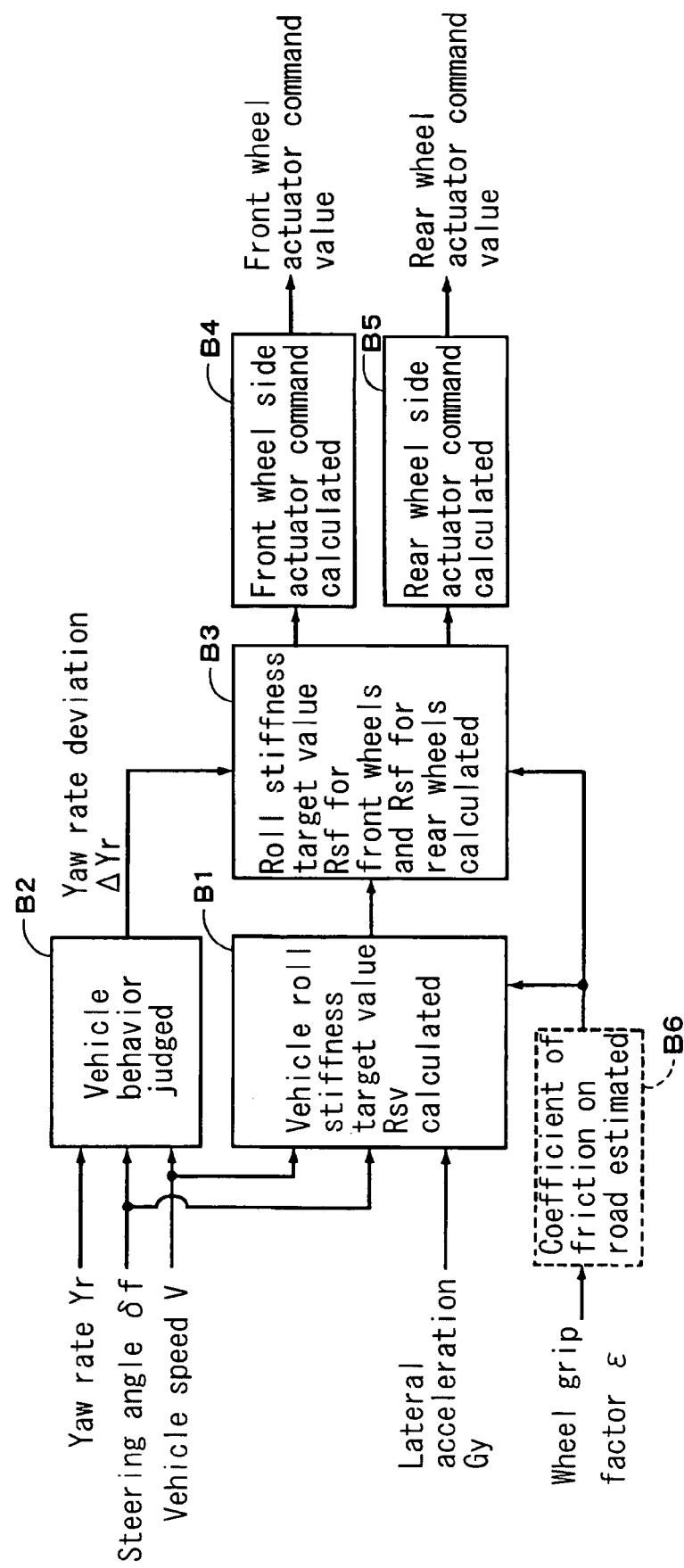
FIG. 5 is a control block view for controlling the vehicle rolling according to the first embodiment of the present invention.

As shown in FIG. 5, at a vehicle roll stiffness target value Rsv calculation block B1, a vehicle roll stiffness target value Rsv is calculated based on a steering angle δf, a vehicle speed V, a lateral acceleration Gy, and wheel grip factor ε to serve as a control parameter. The vehicle roll stiffness target value Rsv is a target value for determining the degree of the roll angle of the vehicle. At a vehicle behavior judging block B2, a yaw rate deviation (ΔYr) is obtained to judge the dynamic steering characteristics of the vehicle, that is, the degree of the oversteer and understeer based thereon. At roll stiffness calculation block B3 for the front wheels and rear wheels, the roll stiffness distribution (i.e., the distribution of the vehicle roll stiffness between front and rear suspension expressed as percentage of the vehicle roll stiffness (Gillespie, '*Fundamental of Vehicle Dynamics*' published by Society of Automotive Engineering, Inc., 1992)) of the front wheels and the rear wheels is calculated based on the vehicle speed. V, the dynamic steering characteristics, and the wheel grip factor ε to distribute the calculated vehicle roll stiffness target values Rsf, Rsr (i.e., shown in block B4, block B5), to be determined as command values to an actuator for front wheels and an actuator for rear wheels.

Figure 6:
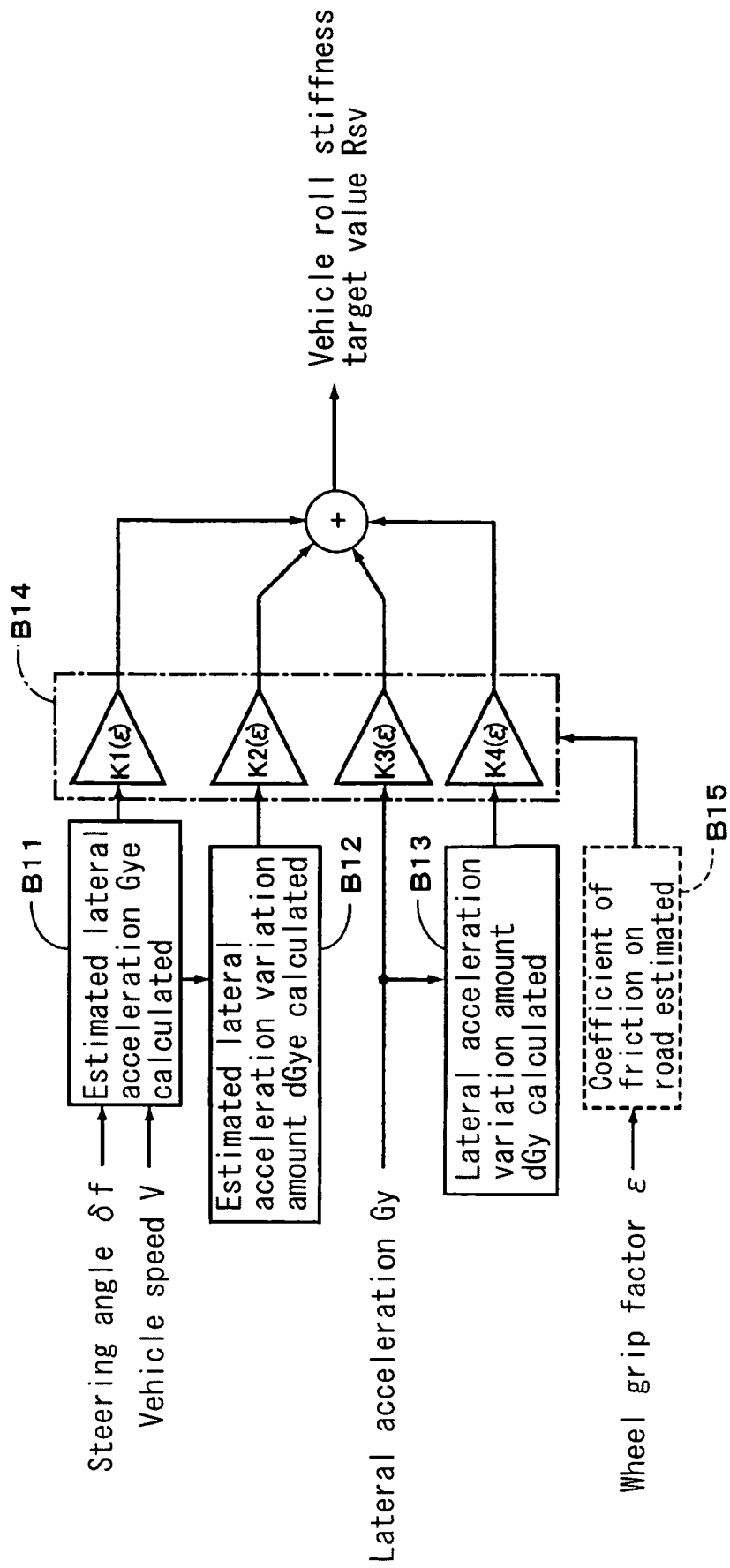
FIG. 6 is a control block showing an example of a vehicle roll stiffness target value calculation according to the embodiments of the present invention.

Referring to FIG. 6, an example of the vehicle roll stiffness target value Rsv performed at the block B1 will be explained as follows. Because the vehicle rolling is generated by the inertia affecting the vehicle body, the appropriate control cannot be performed considering the operational delay of the actuator, or the like, in case the roll control amount is determined in accordance with the detected result of the lateral acceleration Gy. Thus, it is necessary to determine the control amount based on the steering angle δf corresponding to the input to the vehicle to compensate the operational delay of the actuator, or the like. Accordingly, in order to calculate the vehicle roll stiffness target value Rsv, estimated value Gye of the lateral acceleration obtained from the vehicle speed V and the steering angle δf at the block B11, lateral acceleration Gy, estimated lateral acceleration time variation dGye, and lateral acceleration time variation dGy calculated at block B12 and block B13 are considered. The estimated value Gye of the lateral acceleration is calculated in the following formula.

$$Gye=(V^2 \cdot \delta f)/\{L \cdot N \cdot (1+Kh \cdot V^2)\}$$

Where, V stands for the vehicle speed, ·δf stands for the steering wheel angle (of the steering wheel), L stands for a wheel base, N stands for steering gear ratio, and Kh stands for stability factor.

The vehicle roll stiffness target value Rsv is the sum of the calculated estimated amount Gye of the lateral acceleration, the estimated lateral acceleration time variation dGye, the lateral acceleration Gy, and the lateral acceleration time variation dGy multiplied by gains K1, K2, K3, K4 respectively. Thus, the vehicle roll stiffness target value Rsv is obtained with the following formula at block B14.

$$Rsv=K1(\epsilon) \cdot |Gye|+K2(\epsilon) \cdot |dGye|+K3(\epsilon) \cdot |Gy|+K4(\epsilon) \cdot |dGy|$$

As shown with dotted line of FIG. 6, the coefficient μ of friction on road may be obtained using the wheel grip factor ε at the block B15 to determine the gains K1, K2, K3, K4 using the coefficient μ of friction on road.

Figure 7:
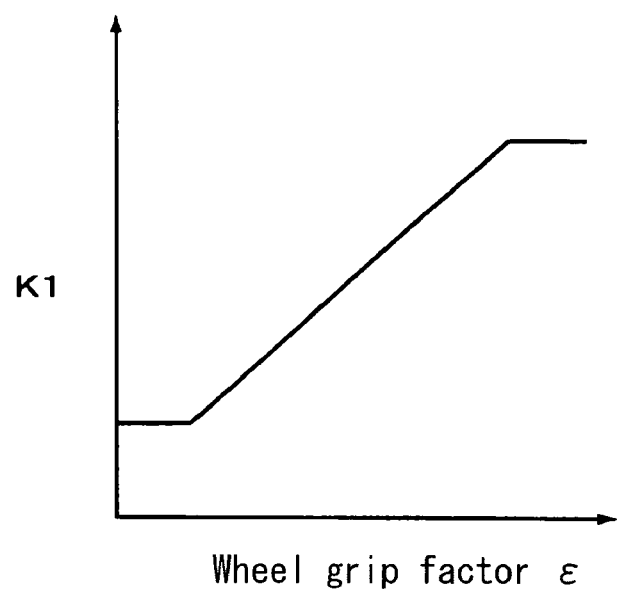
FIG. 7 is a graph for setting a gain K1 for an estimated lateral acceleration in accordance with the wheel grip factor according to the embodiments of the present invention.
Figure 8:
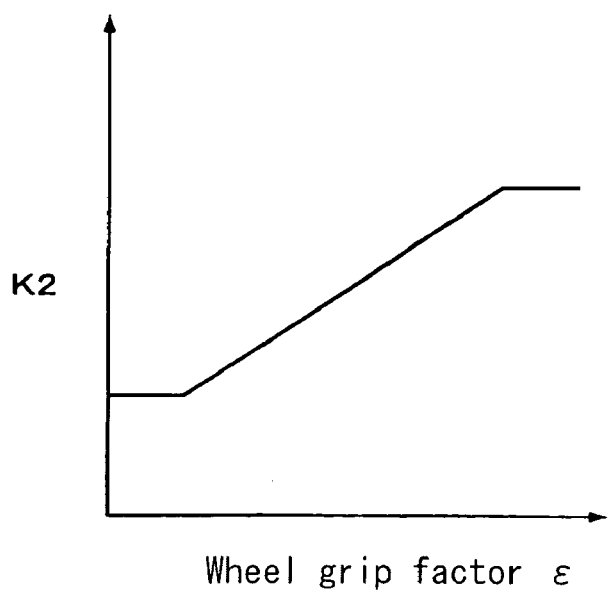
FIG. 8 is a graph for setting a gain K2 for the estimated lateral acceleration in accordance with the wheel grip factor according to the embodiments of the present invention.
Figure 9:
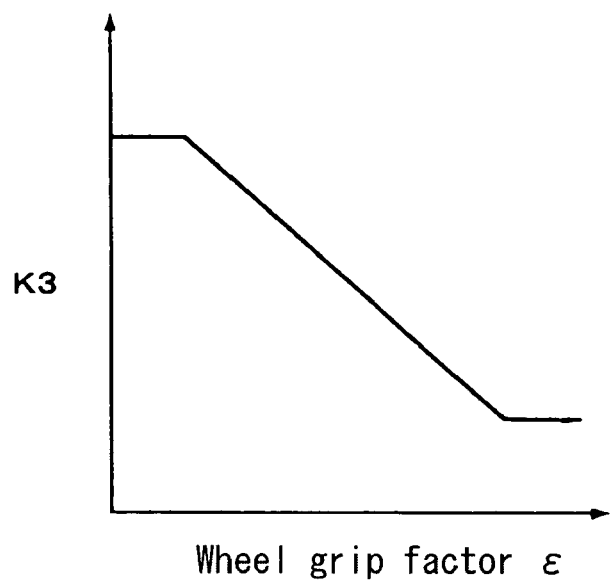
FIG. 9 is a graph for setting a gain K3 for the estimated lateral acceleration in accordance with the wheel grip factor according to the embodiments of the present invention.
Figure 10:
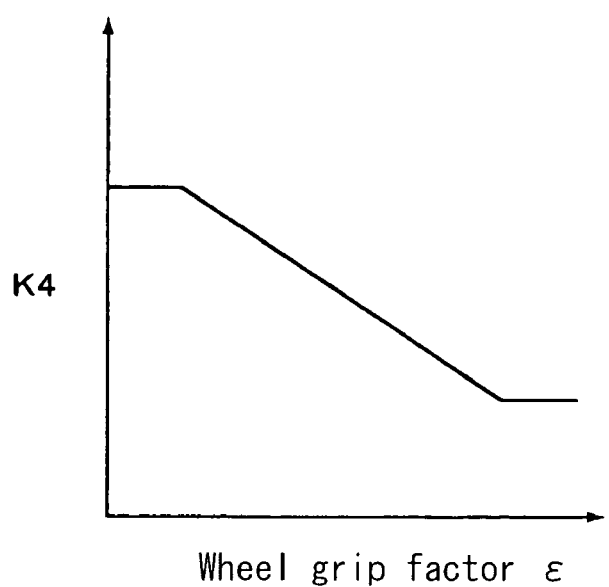
FIG. 10 is a graph for setting a gain K4 for the estimated lateral acceleration in accordance with the wheel grip factor according to the embodiments of the present invention.

As shown at block B11 of FIG. 6, because the estimated lateral acceleration Gye is obtained from the steering angle δf and the vehicle speed V, the estimated lateral acceleration Gye is outputted larger relative to the actual lateral acceleration in case of the low coefficient of friction on road. Thus, it is necessary to compensate the contribution of the estimated lateral acceleration in the following manner estimating the low coefficient of friction on road based on the wheel grip factor ε. That is, because the wheel grip factor ε assumes low in case of the low coefficient of friction on road, as shown in FIGS. 7-8, the gain K1 and gain K2 regarding the estimated lateral acceleration Gye are determined to be low upon the decline of the wheel grip factor ε to reduce the contribution thereof. Further, in order to determine the contribution regarding the estimated lateral acceleration to be relatively low, as shown in FIGS. 9-10, the gain regarding the actual lateral acceleration Gy may be determined to be higher as the decline of the wheel grip factor ε.

Figure 11:
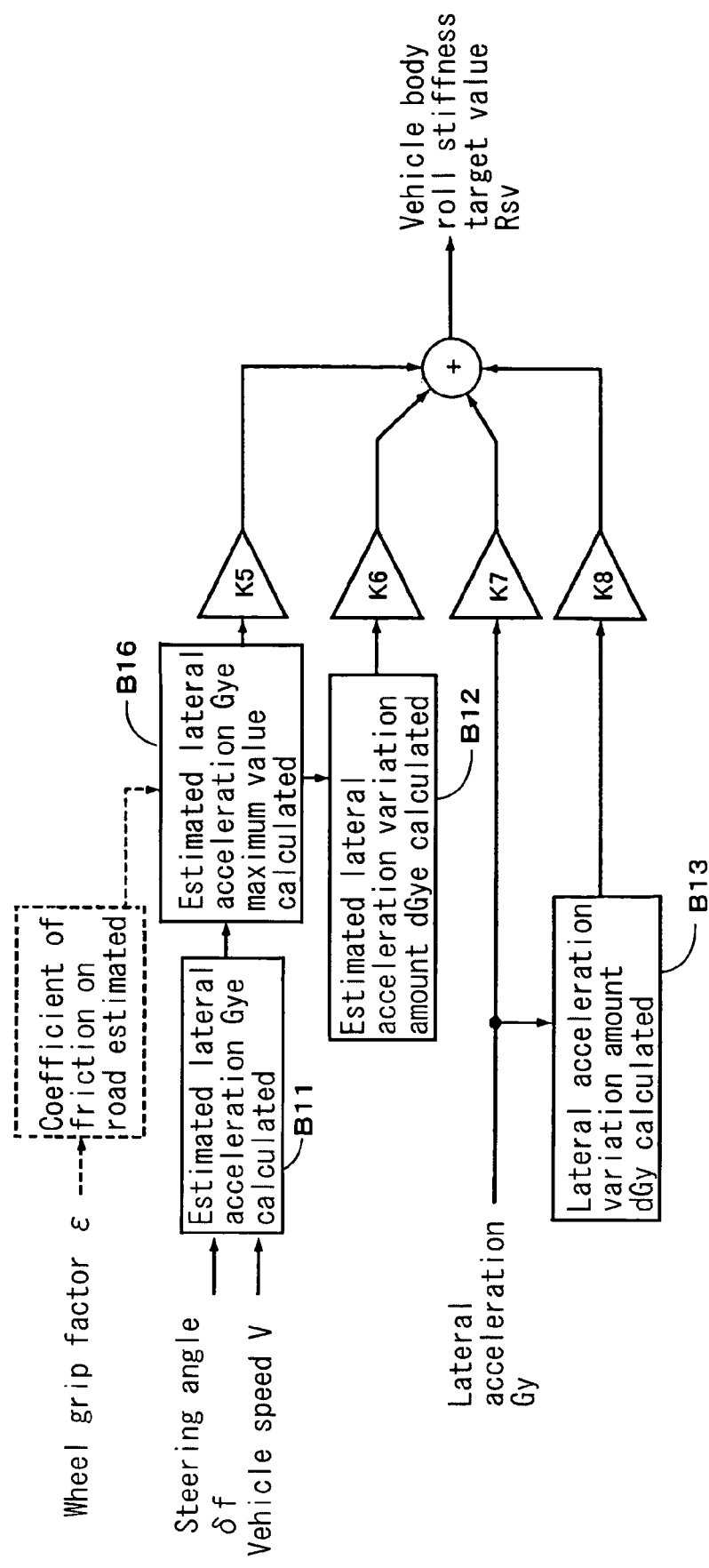
FIG. 11 is a control block showing a second example of vehicle roll stiffness target value calculation according to the first embodiment of the present invention.
Figure 12:
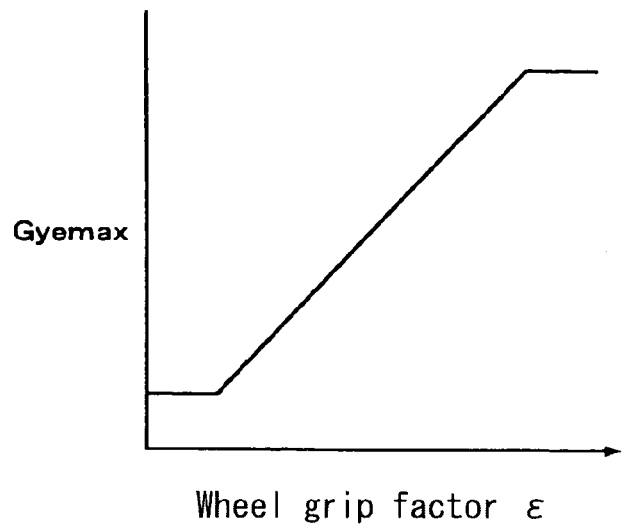
FIG. 12 is a graph for setting the maximum value of the estimated lateral acceleration in accordance with the wheel grip factor according to the first embodiment of the present invention.

As explained above, the method for compensating the estimated lateral acceleration Gye in case of the low coefficient of friction on road by adjusting the gain based on the wheel grip factor ε is shown in FIG. 6. In the means time, as shown in FIG. 11, the estimated lateral acceleration Gye may be compensated by determining the maximum limitation relative to the estimated lateral acceleration Gye based on the wheel grip factor ε at block B16. For example, as shown in FIG. 12, the maximum value Gyemax of the estimated lateral acceleration may be determined to be lower at the lower wheel grip factor ε because of the low coefficient of friction on road and may be determined to be higher at the higher wheel grip factor ε. In this case, likewise as shown in FIG. 6, the coefficient of friction on road may be estimated using the wheel grip factor ε to determined the maximum value Gyemax using thereof.

The estimated lateral acceleration Gye and the estimated lateral acceleration time variation dGye may be replaced by the steering angle δf and the steering angle speed dδf. In this case, likewise upon the use of the estimated lateral acceleration Gye, the control gain is adjusted based on the coefficient of friction on road obtained from the wheel grip factor ε and the coefficient of friction on road obtained from the wheel grip factor ε. Further, the degree of the influence of the steering angle δf and the steering angle speed dδf may be adjusted by providing the maximum limit of the steering angle δf.

Figure 13:
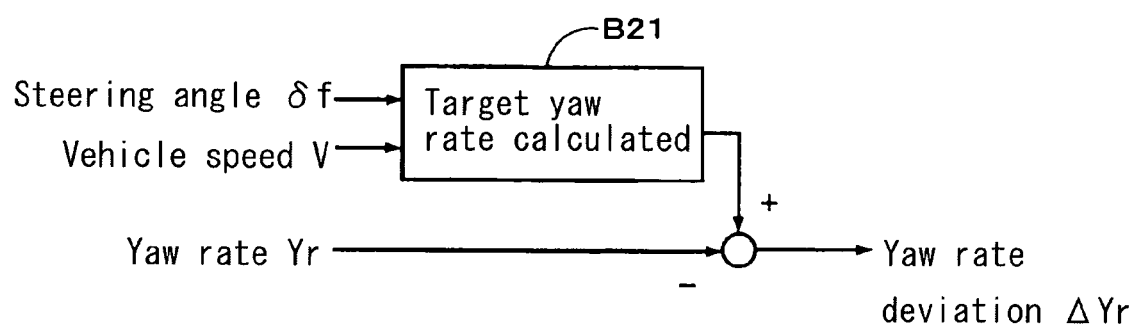
FIG. 13 is a control block for judging vehicle dynamic steering characteristics according to the first embodiment of the present invention.

FIG. 13 shows the detail of the vehicle behavior judging block B2 of FIG. 5, which corresponds to the control block for judging the dynamic steering characteristics of the vehicle. As shown in FIG. 13, the target yaw rate Yrd is calculated from the vehicle speed V and the steering angle δf at block B21, which is shown as the following equation.

$$Yrd=(V \cdot \delta f)/\{L \cdot N(1+Kh \cdot V^2)\}$$

Where, L stands for the wheel base, N stands for the steering gear ratio, and Kh stands for the stability factor. Thereafter, yaw rate deviation ΔYr (=|Yrd|−|Yr|) between the absolute value |Yrd| of the target yaw rate and the absolute value |Yr| of the actual yaw rate detected by the yaw rate sensor YR is calculated. In case the yaw rate deviation ΔYr is greater than zero (i.e., ΔYr>0), it is judged likely to be understeer. In case the yaw rate deviation ΔYr is less than zero (i.e., ΔYr<0), it is judged likely to be oversteer. Although the yaw rate is used as the vehicle state amount in the embodiment of the present invention, the dynamic steering characteristics of the vehicle may be judged by the lateral acceleration, the vehicle slip angle, the speed differences between wheels at right or left, and the combinations thereof.

Figure 14:
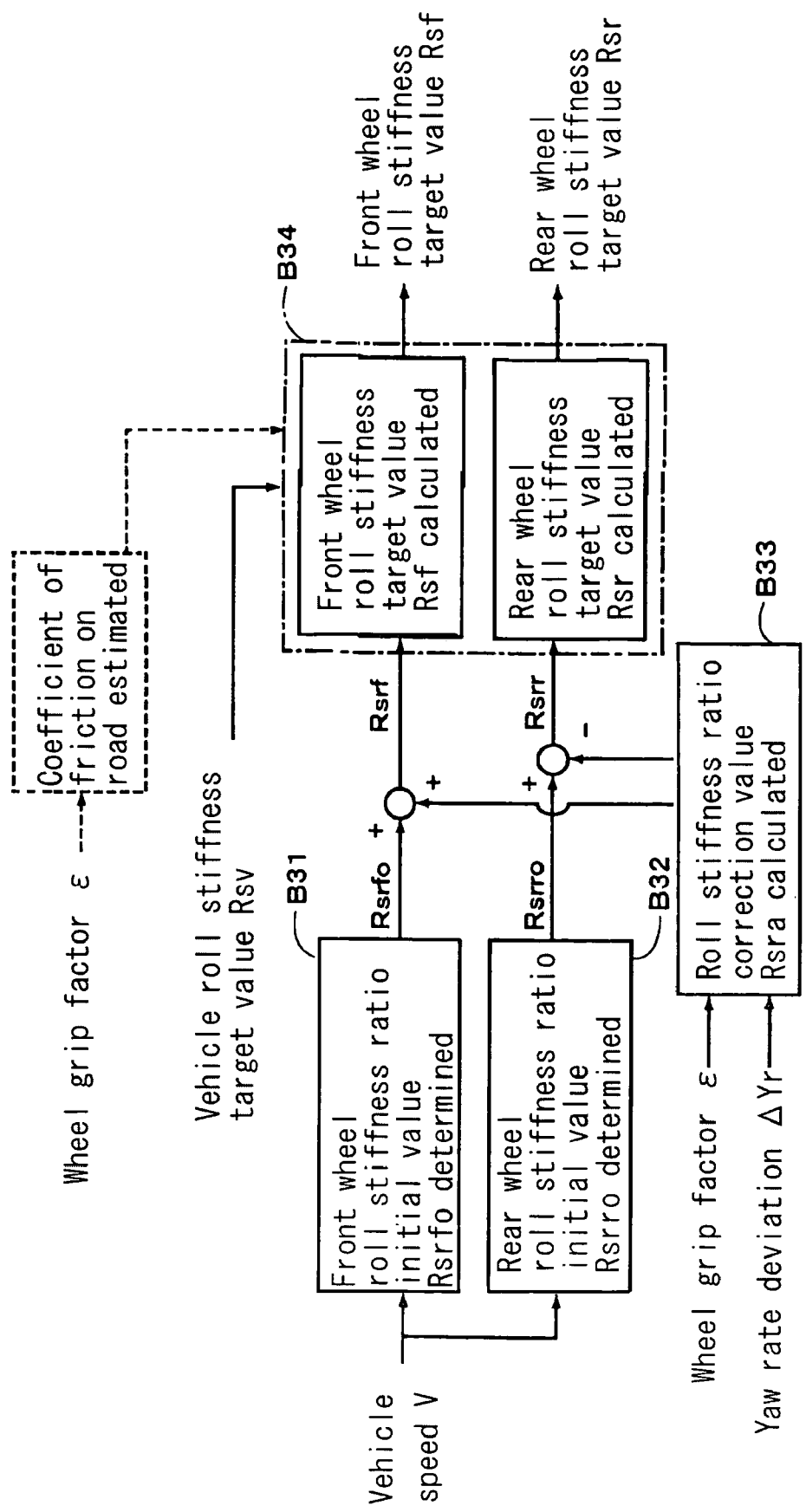
FIG. 14 is a control block view showing target value calculation of the roll stiffness for front wheels and rear wheels according to the first embodiment of the present invention.
Figure 15:
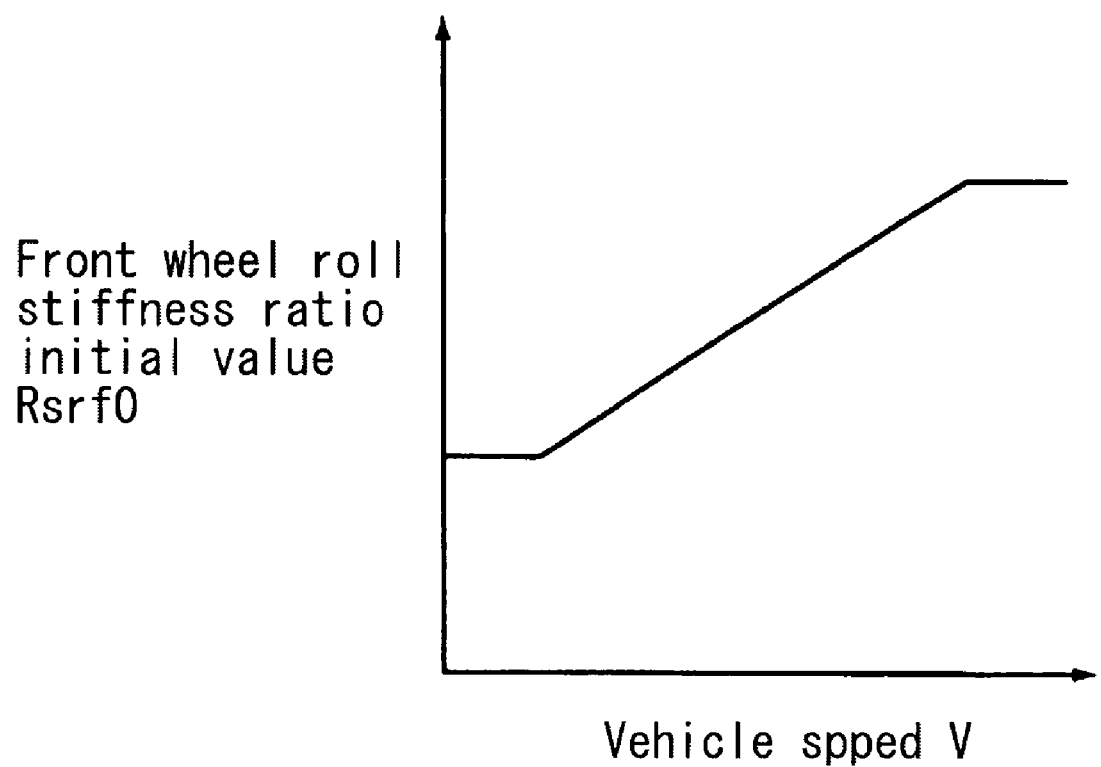
FIG. 15 is a graph for setting front wheel roll stiffness distribution in accordance with the wheel grip factor according to the first embodiment of the present invention.

FIG. 14 shows the detail of the target value calculation block B3 of the roll stiffness at the front wheels and the rear wheels. The roll stiffness distribution Rsrf, Rsrr at the front wheels and the rear wheels are calculated based on the vehicle behavior judgment result and the wheel grip factor ε to determine the roll stiffness target value Rsf, Rsr at the front wheels and the rear wheels based on the calculated result. At FIG. 14, first, an initial value Rsrf0 of the roll stiffness distribution at the front wheels is determined based on the vehicle speed V. In this case, an initial value Rsrr0 of the roll stiffness distribution is determined to be Rsrr0=1−Rsrf0. At the initial setting, as shown in FIG. 15, the initial value Rsrf0 of the roll stiffness distribution at the front wheels is determined to be higher in case the vehicle speed V is higher, and thus, the vehicle characteristic can be set more stable.

The initially determined roll stiffness distribution Rsrf0, Rsrr0 are corrected in accordance with roll stiffness distribution correction value Rsra calculated by the wheel grip factor ε and the dynamic steering characteristics (i.e., the yaw rate deviation ΔYr) at the block B33 of FIG. 14, thus the roll stiffness distribution Rsrf, Rsrr at the front wheels and rear wheels are obtained. The roll stiffness distribution Rsrf, Rsrr at the front wheels and the rear wheels respectively are corrected by increasing the roll stiffness distribution Rsrf at the front wheels and reducing the roll stiffness distribution Rsrr at the rear wheels as the decline of the wheel grip factor ε. In this case, the correction may be performed by estimating the coefficient of friction on road without directly adopting the wheel grip factor ε as the correction parameter for the roll stiffness distribution.

The dynamic steering characteristics is corrected in order to reduce the roll stiffness distribution Rsrf at the front wheels and to increase the roll stiffness distribution Rsrr at the rear wheels depending on the degree in case of the understeer (i.e., ΔYr>0). On the other hand, in case of the oversteer (i.e., ΔYr<0), the roll stiffness distribution Rsrf at the front wheels is increased and the roll stiffness distribution Rsrr at the rear wheels is reduced depending on the degree of the oversteer. Accordingly, upon the decline of the wheel grip factor ε at which the coefficient of friction on road declines, the roll stiffness distribution is corrected so that the roll stiffness distribution at the front wheels assumes larger, thus to further improve the vehicle stability. Further, by correcting the roll stiffness distribution based on the dynamic steering characteristics, the understeer and oversteer are restrained to ensure the appropriate steering characteristics.

Thus, the roll stiffness target values Rsf (i.e., Rsf=Rsv·Rsrf) and Rsr (i.e., Rsr=Rsv·Rsrr) at the front wheels and at the rear wheels are obtained at the block B34 of FIG. 14 based on the roll stiffness distribution target value Rsrf, Rsrr and the vehicle roll stiffness target value Rsv obtained as shown through FIGS. 6-12. Following the target values, the spring control means SPxx, and the actuators for the stabilizer control means FT, RT are controlled.

As foregoing, with the construction of the embodiment of the present invention, because the vehicle behavior can be estimated before the tires reach the limit by the wheel grip factor ε, the frictional state between the road surface and the vehicle wheel (i.e. tire) can be accurately recognized to perform the appropriate roll control by determining the control parameter as the foregoing. The wheel grip factor ε is estimated based on the steering torque Tstr detected by the steering torque sensor ST and the output torque Teps of the electric power steering system EPS detected based on the detection result of the driving electric current of the EPS motor controlled in accordance with the value of the detected steering torque Tstr. The wheel grip factor ε is also estimated at the steer-by-wire front wheel steering system in which the steering wheel SW and the wheels WHfr, WHfl are not mechanically connected.

A second embodiment for estimating the wheel grip factor at the steer-by-wire front wheel steering control system will be explained as follows. The construction of the steering control is, for example, described in JP2001-191937A2, and thus the explanation is not repeated. The front wheel steering control system includes a normal mechanical connection means, and the steering control may be conducted by a driving means in which an only rear wheel steering control system is mechanically separated. Further, the steering angle of each wheel may be controlled independently.

The second embodiment includes a premise that the reaction torque that the wheels receive from the road surface can be estimated by detecting the driving electric current of the motor because the driving signal (i.e., driving electric current) of the motor serving as the driving means of the front wheel steering control system and the output torque thereof are proportional to each other. The road surface reaction torque estimated as the foregoing includes the element by the friction of steering system members, and thus the element deriving from the friction of the steering system element is compensated by the road surface reaction torque estimated by the driving electric current of the motor to obtain the aligning torque. Accordingly, the wheel grip factor ε corresponding to the grip state of the wheel relative to the road surface is estimated based on the relationship between the aligning torque and the wheel index shown by the slip angle or the side force.

Figure 16:
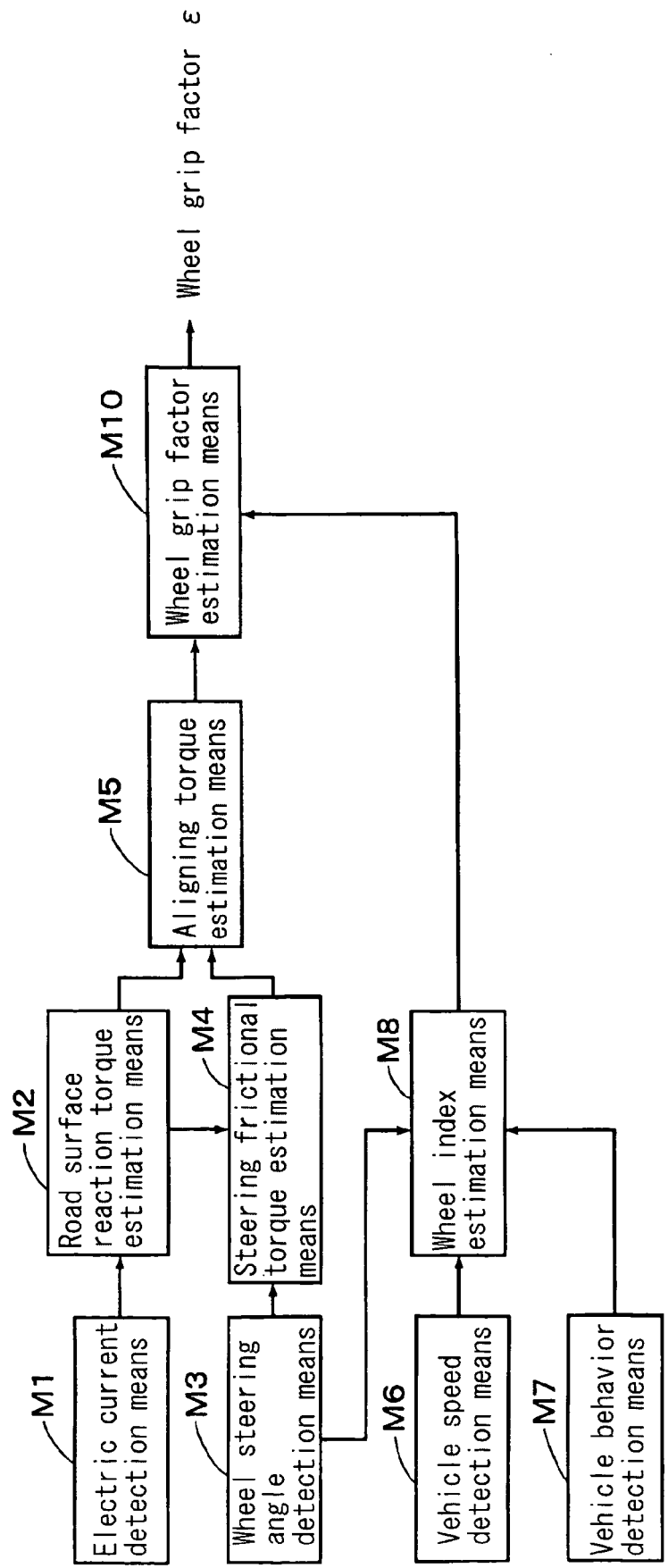
FIG. 16 is a block view showing wheel grip factor estimation according to a second embodiment of the present invention.

As shown in FIG. 16, the driving electric current of the motor under the steering control is detected by an electric current detection means M1. A road surface reaction torque is estimated at a road surface reaction torque estimation means M2 based on the detected result at the electric current detection means M1. A vehicle wheel steering angle is detected by a wheel steering angle detection means M3. A steering friction torque corresponding to the frictional element of the steering system member is estimated at a steering friction torque estimation means M4 based on the vehicle wheel steering angle. An aligning torque is estimated at an aligning torque estimation means M5 based on the road surface reaction torque and the steering friction torque. In the meantime, at least one wheel index Wx including the side force Fy and the slip angle α relative to the wheel is estimated at a wheel index estimation means M8 based on the vehicle speed detected at a vehicle speed detection means M6, the vehicle behavior detected at a vehicle behavior detection means M7, and the vehicle wheel steering angle detected at the wheel steering angle detection means M3. Thereafter, the wheel grip factor ε relative to the wheel is estimated at a wheel grip factor estimation means M10 based on the change of the aligning torque estimated at the aligning torque estimation means M5 relative to the vehicle index estimated at the wheel index estimation means M8.

With the vehicle including the electric power steering system EPS according to the embodiment shown in FIG. 1, likewise the electric current detection means M1 of FIG. 16, the road surface reaction torque is estimated based on the output torque Teps of the electric power steering system EPS and the detection steering torque Tstr of the steering torque sensor ST to estimate the steering friction torque at the steering friction torque estimation means M4.

Figure 17:
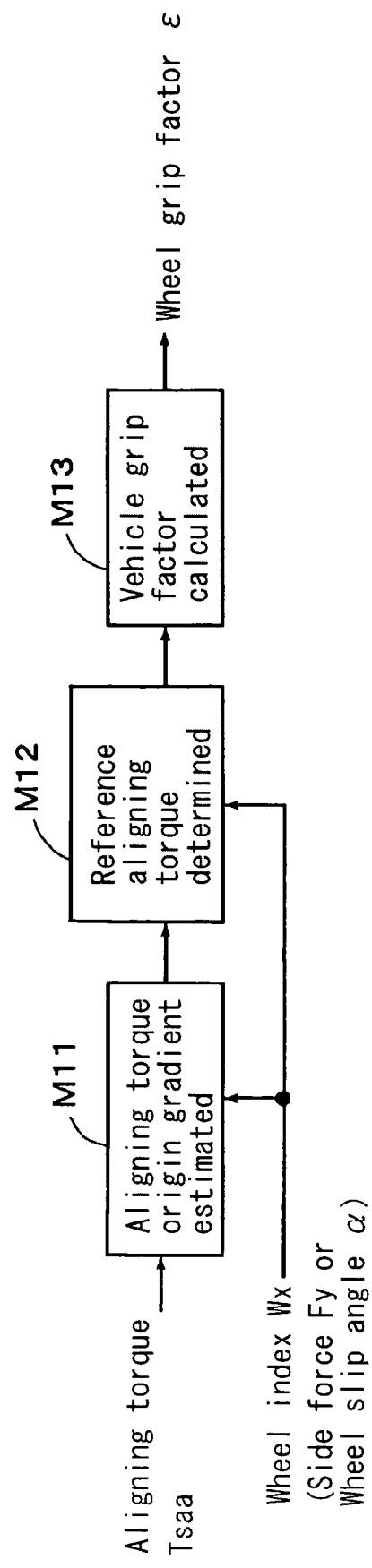
FIG. 17 is a block view of a wheel grip factor estimation means according to the second embodiment of the present invention.

FIG. 17 shows the block view for obtaining the wheel grip factor ε from the aligning torque and the wheel index (i.e., the side force Fy or the slip angle α) at the wheel grip factor estimation means M10. In other words, origin gradient K (i.e., a gradient of the aligning torque in the vicinity of the origin) relative to the wheel index Wx of the aligning torque is obtained at an aligning torque origin gradient estimation block M11 based on the wheel index Wx indicated with the side force Fy or the slip angle α obtained at the wheel index estimation means M8 and the aligning torque Tsa obtained at the aligning torque estimation means M5. Further, a reference aligning torque showing the state that the vehicle wheel is approximately completely gripped in the lateral direction is determined based on the origin gradient K at block M12. Thereafter, the wheel grip factor ε is obtained based on the reference aligning torque and the actual aligning torque obtained at the aligning torque estimation means M5 at wheel grip factor calculation block M13.

Figure 18:
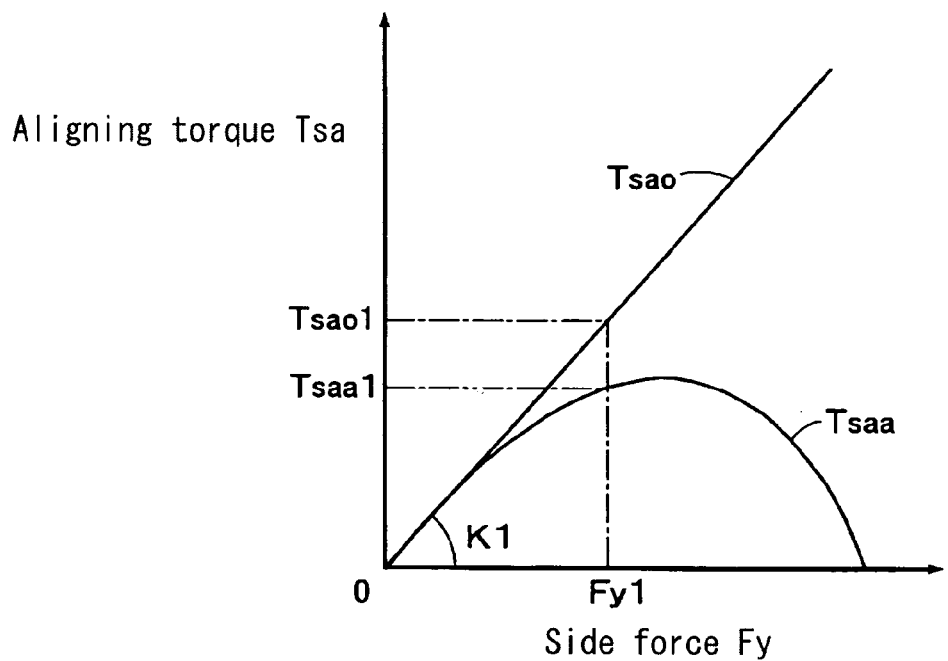
FIG. 18 is a graph showing characteristics of an aligning torque relative to side force according the embodiments of the present invention.

An example of the estimation of the wheel grip factor ε using the side force Fy as the wheel index Wx will be explained. As shown in FIG. 18, the characteristics of the aligning torque relative to the side force assume to form a curve shown as Tsaa. The wheel grip factor ε can be estimated from the characteristics of the curve Tsaa. First, because a point of application of force of the side force Fy is positioned rearward of centerline of the tire by pneumatic trail en, the moment Fy·en at this time affects as the aligning torque to reduce the slip angle α. In case the tires are attached to the vehicle, the moment for recovering the steering wheel assumes Fy·(en+ec) because vehicle wheels are provided with the caster angle, and thus the caster trail ec in order to facilitate the return of the steering wheel. Thus, provided that the actual aligning torque Tsaa, the following equation is established.

$$Tsaa = Fy \cdot (en+ec)$$

Accordingly, the nonlinear characteristics of the aligning torque Tsaa relative to the side force Fy shows the direct changes of the pneumatic trail en. Thus, the gradient K1 relative to the side force Fy of the actual aligning torque Tsaa in the vicinity of the origin (0) is identified (i.e., in this case, the front wheel is at gripped state), thus to obtain the characteristics shown with the aligning torque characteristics (i.e., reference aligning torque Tsao) at the completely gripped state. The gradient K1 corresponding to the origin gradient of the aligning torque is, first, determined as a predetermined initial value, and is corrected by identifying the gradient K1 during the traveling at approximately constant speed.

Because the pneumatic trail en is changed in accordance with the gripped state of the vehicle wheel, the reference aligning torque Tsao is determined as Tsao=K1·Fy using the gradient K1 in the vicinity of the origin corresponding to the state that the vehicle wheels are approximately completely gripped (traveling straight state). The wheel grip factor ε is obtained as the ratio of the reference aligning torque Tsao to the actual aligning torque Tsaa (i.e., ε=Tsaa/Tsao). For example, the wheel grip factor ε is obtained as ε=Tsaa1/Tsao1 based on the reference aligning torque Tsao1 (=K1·Fy1) and the actual aligning torque Tsaa1 when the side force is determined as the side force Fy1.

Figure 19:
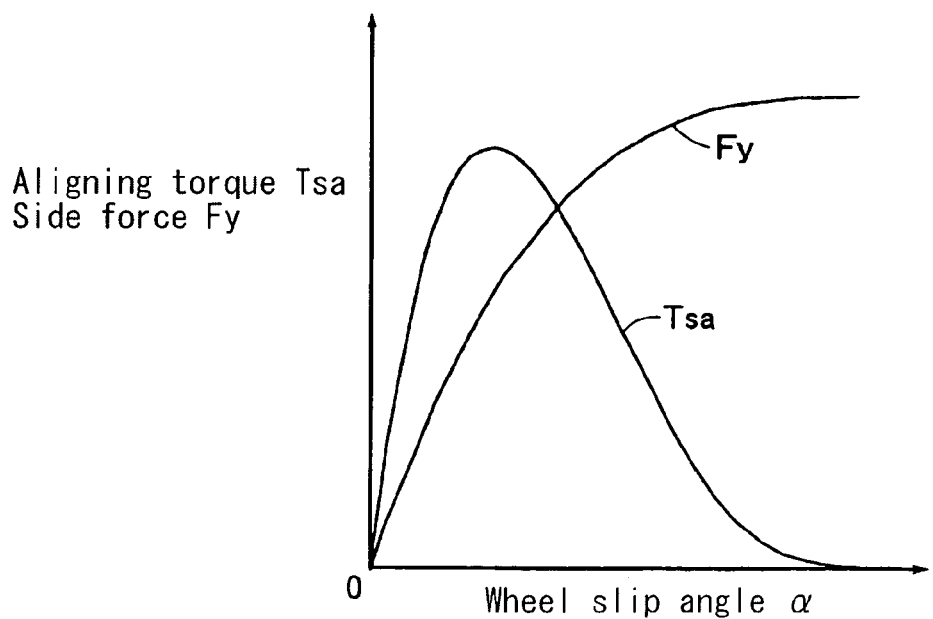
FIG. 19 is a graph showing the relationship between the side force and the aligning torque relative to a slip angle according to the embodiments of the present invention.
Figure 20:
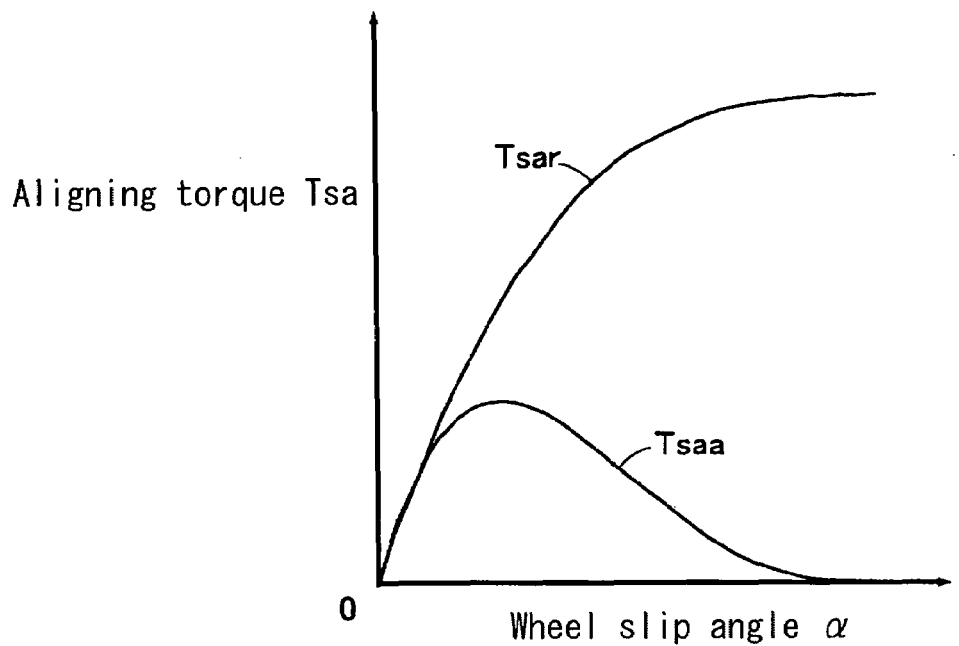
FIG. 20 is a graph showing the relationship between the side force and the aligning torque relative to the slip angle according to the embodiments of the present invention.

An example of the estimation of the wheel grip factor ε in case the slip angle α is used as the wheel index Wx will be explained as follows. The relationship of the side force Fy and the aligning torque Tsa relative to the slip angle α is as shown in FIG. 19. Likewise the case that the side force is determined as the wheel index, the reference aligning relative to the slip angle at the state that the pneumatic trail is approximately completely at the slipped state assumes to have the nonlinear characteristics relative to the slip angle shown as Tsar in FIG. 20. Because the nonlinear characteristics of the reference aligning depends on the coefficient μ of friction on road, the estimation of the coefficient μ of friction on road is required for determining the reference aligning torque Tsar. However, in case of the state that the wheel grip factor is higher, in other words, at the small slip angle where the vehicle wheel is gripped, the aligning torque Tsa unlikely have the differences depending on the coefficient μ of friction on road, thus it assumes difficult to estimate the coefficient μ of friction on road.

Figure 21:
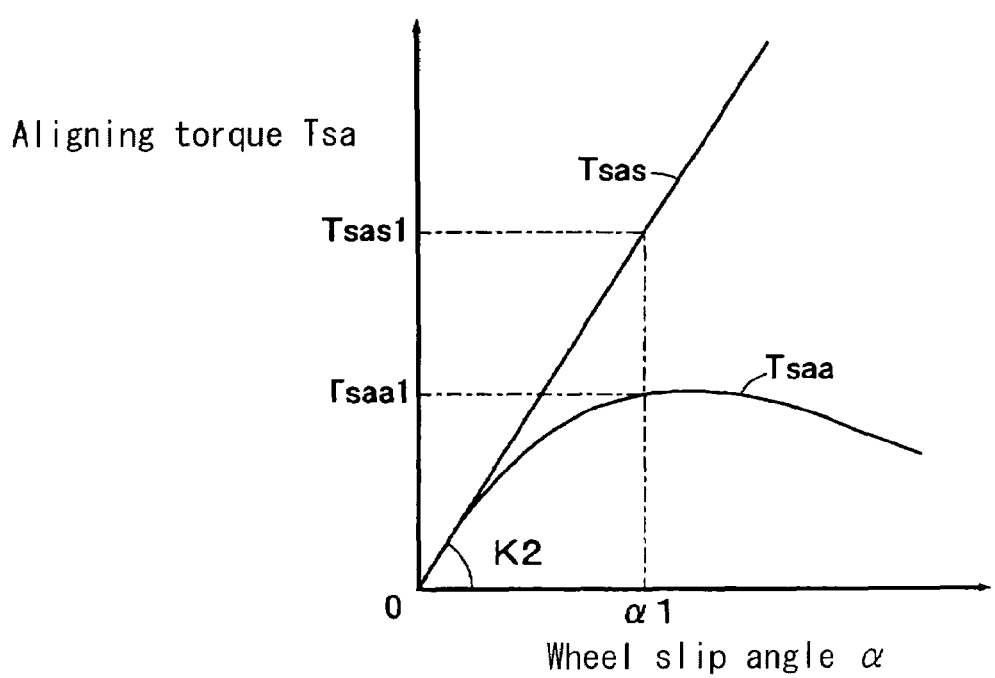
FIG. 21 is a graph showing the relationship between the side force and the aligning torque relative to the slip angle according to the embodiments of the present invention.

Accordingly, in the foregoing case, as shown in FIG. 21, the wheel grip factor is estimated by approximating the reference aligning torque to the linear characteristics. In other words, the gradient K2 of the aligning torque Tsa relative to the slip angle α in the vicinity of the origin of the slip angle α is obtained so that the reference aligning torque Tsas is determined to be Tsas=K2·α. The wheel grip factor ε is determined as the ratio of the reference aligning torque Tsas to the actual aligning torque Tsaa. For example, in case the slip angle is determined as α1, the reference aligning torque is calculated as Tsas1=K2·α1. The wheel grip factor ε is determined as ε=Tsaa1/Tsas1.

Figure 22:
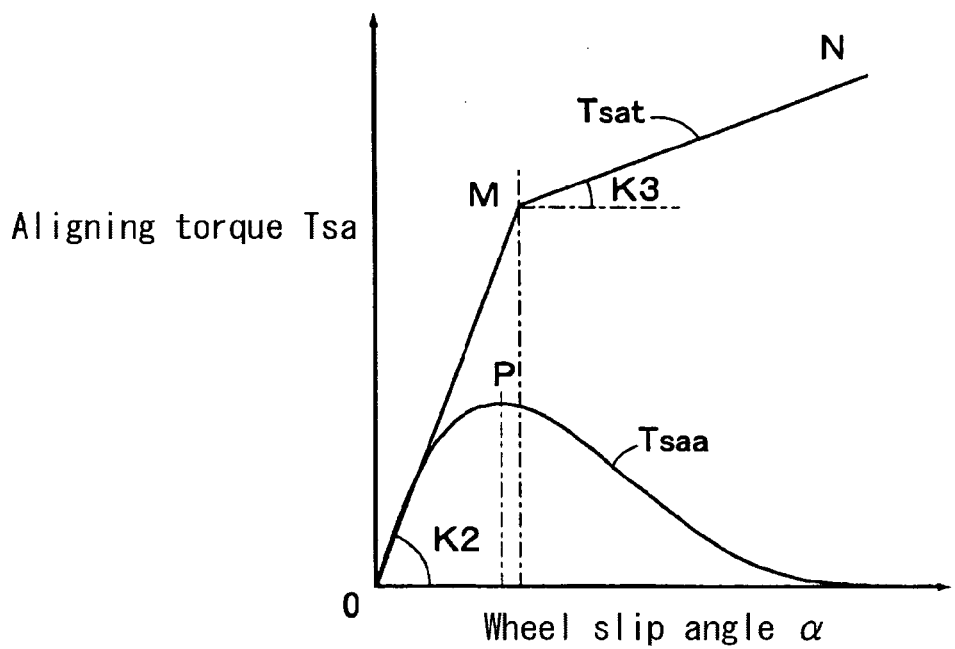
FIG. 22 is a graph showing the relationship between the side force and the aligning torque relative to the slip angle according to the embodiments of the present invention.

With the method for approximating the reference aligning torque to a straight line as shown in FIG. 21, it is concerned that the estimation precision of the wheel grip factor declines at the region where the slip angle α assumes larger. Thus, as shown in FIG. 22, the aligning torque gradient is determined as K3 at the slip angle equal to or greater than a predetermined value to determine the nonlinear characteristics of the reference aligning torque approximating to a straight line as 0MN of FIG. 22. In this case, it is preferable to experimentally obtain the aligning torque gradient K3 in advance to correct by identifying the gradient K3 during the traveling. A point M where the aligning torque gradient changes from K2 to K3 may be determined based on an inflection point P of the actual aligning torque. This is because the coefficient μ of friction on road can be estimated based on the inflection point of the aligning torque. Thus, the aligning torque gradient is changed from K2 to K3 by obtaining the inflection point P of the actual aligning torque Tsaa and determining the slip angle larger than the slip angle of the inflection point P by predetermined value as the point M.

Figure 23:
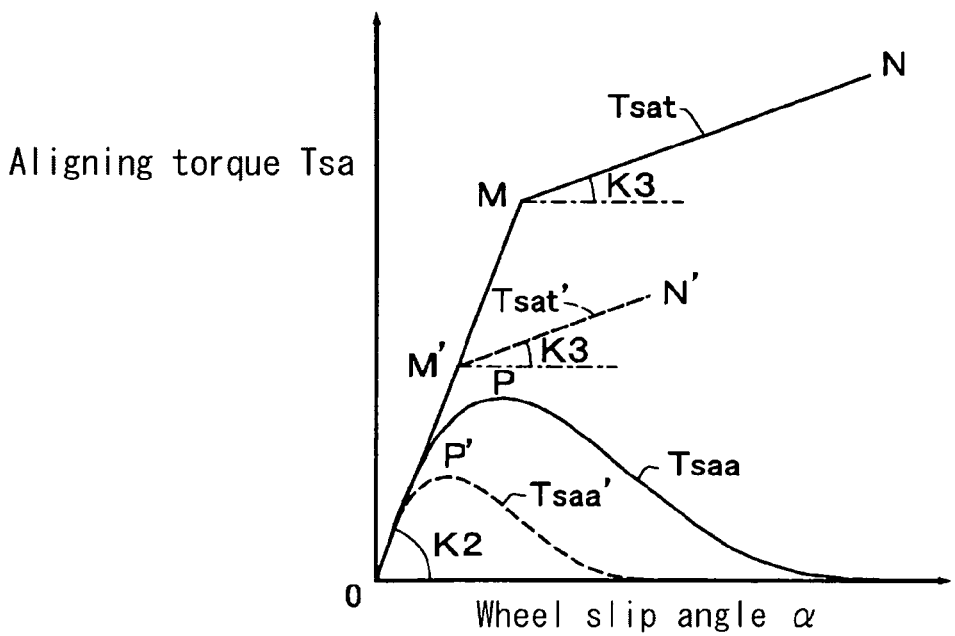
FIG. 23 is a graph showing the relationship between the side force and the aligning torque relative to the slip angle according to the embodiments of the present invention.

Further, because the reference aligning torque relative to the slip angle is influenced by the coefficient μ of friction on road, the reference aligning torque characteristics with higher precision can be determined by setting the reference aligning torque based on the inflection point P of the actual aligning torque Tsaa as shown in FIG. 23. For example, in case the coefficient of friction on road assumes lower, the characteristics of the actual aligning torque Tsaa changes from the characteristic shown with the solid line to the dotted line of FIG. 23. That is, upon the decline of the coefficient μ of friction on road, the inflection point of the actual aligning torque Tsaa changes from the point P to a point P'. Thus, it is required to change the reference aligning torque characteristic (Tsat) from 0MN to 0M'N'. In this case, because the point M' is determined based on the inflection point P', the reference aligning torque characteristics can be determined following the change of the inflection point even at the change of the coefficient of friction on road.

Accordingly, as shown in FIG. 23, the reference aligning torque determines Tsat and Tsat' based on the inflection points P, P' of the actual aligning torque Tsaa and the actual aligning torque Tsaa', which approximates the aligning torque characteristic at the completely gripped state with high precision. Further, the coefficient of friction on road is estimated using the method for estimating the coefficient of friction on road from the wheel grip factor, and the point for changing the aligning torque gradient may be determined in accordance with the estimated coefficient of friction on road.

Figure 24:
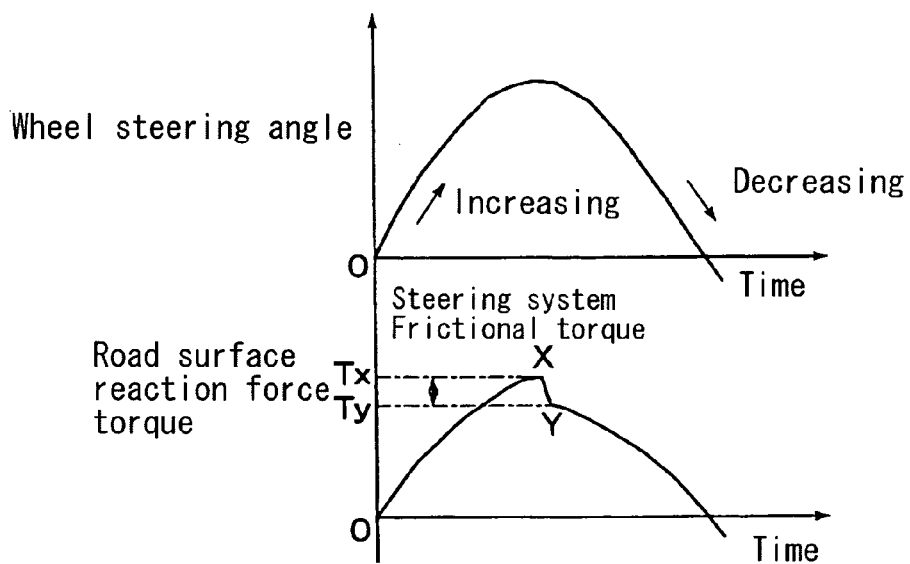
FIG. 24 is a graph showing frictional torque deriving from Coulomb friction of the steering system regarding the correction at the estimation of the aligning torque according to the embodiments of the present invention.

In order to obtain the aligning torque with high precision, it is required to correct the friction element of the steering system from the road surface reaction force torque which can be determined based on the electric current value of the motor, which will be explained with reference to FIGS. 24-25. FIG. 24 shows a method for obtaining the frictional torque deriving from the Coulomb friction of the steering system. First, as shown at top portion of FIG. 24, the road surface reaction force torque when the vehicle wheel steering angle is increased by the steering operation and is immediately before decreased is obtained (i.e., point X at bottom of FIG. 24). Thereafter, the vehicle wheel steering angle is decreased by the steering operation as shown at the top of FIG. 24 to obtain the road surface reaction force torque Ty at the point where the variation amount of the road surface reaction force torque relative to the steering angle variation is changed (i.e. the point Y at bottom of FIG. 24). The steering system frictional torque is obtained by deducting the road surface reaction force torque Ty from the road surface reaction force torque Tx. The foregoing friction torque calculation is performed every steering operation, and the average value among the plural calculation is used as the friction torque value.

The correction of the steering system friction torque will be explained with reference to FIG. 25. The friction torque is corrected assuming that the road surface reaction force torque and the aligning torque have the relationship having the hysteresis shown with a chain dotted line of FIG. 25 (i.e., assuming that the friction torque is constant). In this case, the value of the steering system friction torque obtained in FIG. 24 is adopted and the gradient of the aligning torque Tsa relative to the road surface reaction force torque Tstr is one (1). In case of the straight traveling state, the road surface reaction force torque Tstr assumes zero (0). When the operator starts the steering operation and the vehicle wheel steering angle starts increasing, the road surface reaction torque Tstr starts generating. In this case, the torque for canceling the Culomb friction of the steering mechanism is generated, first, and the vehicle wheels (i.e., tires) start turning to generate the aligning torque thereafter.

Figure 25:
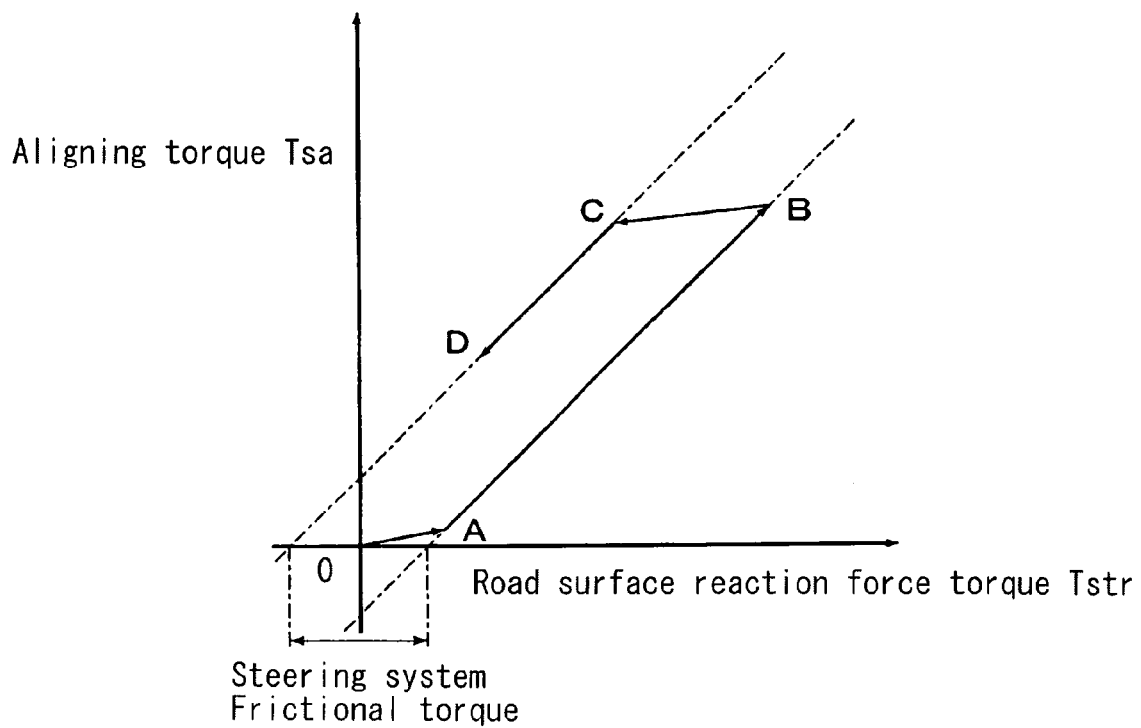
FIG. 25 is a graph showing characteristics of the frictional element of the steering system for the correction at the estimation of the aligning torque according to the embodiments of the present invention.

Accordingly, at the initial stage where the steering operation is conducted from the straight traveling state (i.e., within the range of the hysteresis by the frictional torque), as shown 0-A of FIG. 25, because the aligning torque has not generated yet, with the actual reaction torque increased, the estimated value of the aligning torque is outputted as the actual aligning torque Tsaa with a small gradient relative to the road surface reaction force torque (i.e., although it is the value after the correction and the estimated value to be precise, the word indicating the estimated value is omitted). In case the road surface reaction torque exceeds the friction torque region due to the increase of the vehicle wheel steering angle by further increasing the steering angle of the steering wheel, the actual aligning torque Tsaa is outputted along A-B of FIG. 25. In case the road surface reaction force torque reduces by decreasing the steering angle of the steering wheel, the actual aligning torque Tsaa is outputted having the small gradient as shown with B-C of FIG. 25. Likewise at the increase of the steering angle of the steering wheel, in case the road surface reaction force torque exceeds the friction torque region, the actual aligning torque Tsaa is outputted along C-D of FIG. 25.

Figure 26:
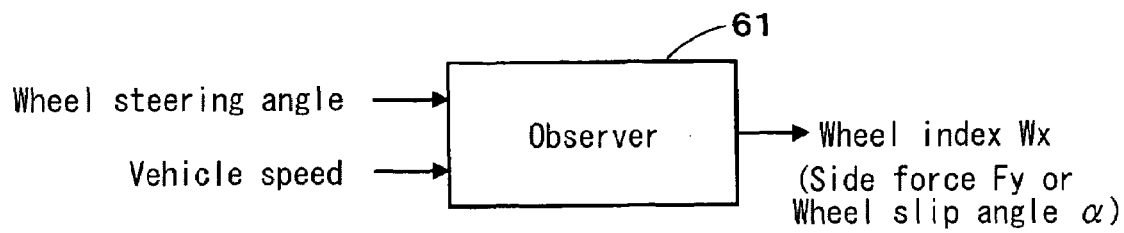
FIG. 26 is a block view for estimating wheel index from wheel steering angle and vehicle speed using an observer based on a vehicle model.
Figure 27:
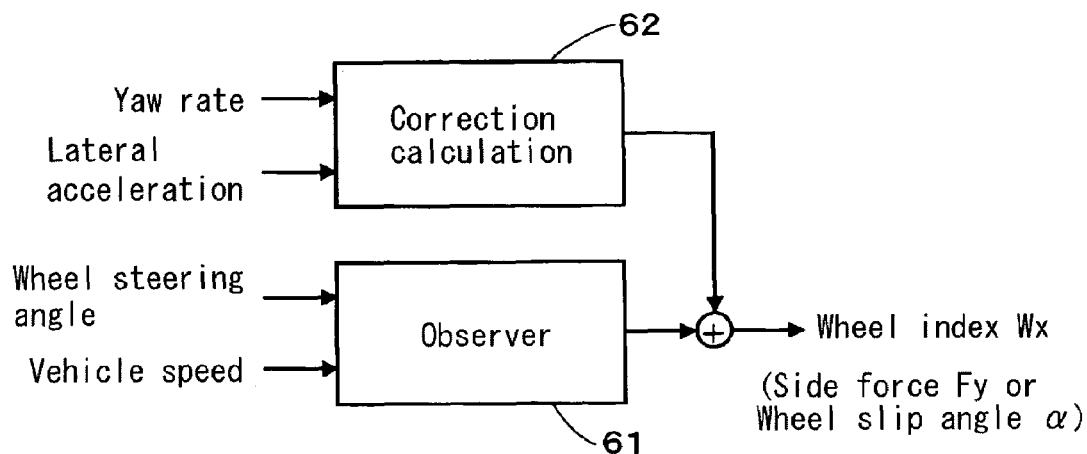
FIG. 27 is a block view for estimating the wheel index by correction calculation transaction based on the observer based on the vehicle model.
Figure 28:
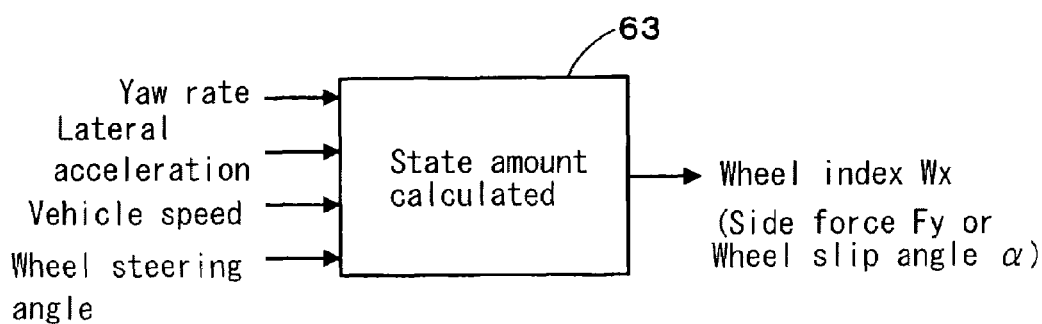
FIG. 28 is a block view for directly calculating the wheel index as the state amount calculation transaction without using the observer according to the embodiments of the present invention.

FIGS. 26-28 show embodiments for estimating the wheel index Wx (i.e., the side force Fy or the slip angle α according to the embodiments of the present invention). FIG. 26 shows an example for estimating the wheel index from the vehicle wheel steering angle and the vehicle speed using an observer 61 based on the vehicle model. The vehicle model is expressed based on the equation of state of the vehicle, the vehicle parameter such as the wheel base, and the parameters showing the tire characteristics, or the like. FIG. 27 shows an example for improving the estimation precision of the wheel index having the observer 61 based on the vehicle model as the base and by performing a correction calculation transaction 62 by the feedback of the sensor signals such as the yaw rate and the lateral acceleration, or the like. As shown in FIG. 28, the wheel index Wx can be directly calculated with a state amount calculation transaction 63 from the vehicle wheel steering angle, the vehicle speed, the lateral acceleration, and the yaw rate, or the like, without using the observer. Further, plural estimation means from the foregoing means may be performed simultaneously, and the wheel index Wx may be obtained considering the contribution of the estimated result of plural estimation means.

In the foregoing embodiments, the wheel grip factor ε is obtained based on the aligning torque noting that the change of the pneumatic trail of the tire. In addition to that, the wheel grip factor (referred as the wheel grip factor εm) showing the degree of the grip in the lateral direction relative to the vehicle wheel can be estimated based on the percentage of allowance for the side force relative to the road surface friction.

According to the theoretical model of the tire for analyzing the force produced on the tire (i.e., a brush model), the relationship between the side force Fy of the vehicle wheel and the aligning torque Tsaa is shown as the following equations: provided that $$\xi = 1 - \{Ks/(3 \cdot \mu \cdot Fz)\} \cdot \lambda$$

If ξ is greater than zero, $Fy = \mu \cdot Fz \cdot (1 - \xi^3)$ [Formula 1]
If ξ is equal to or less than zero, $Fy = \mu \cdot Fz$ [Formula 2]
And if ξ is greater than zero, $Tsaa = (1 \cdot Ks/6) \cdot \lambda \cdot \xi^3$ [Formula 3]
If ξ is equal to or less than zero, $Tsaa = 0$ [Formula 4].

where, Fz stands for the vertical load, l stands for the length of the tire surface contacting the road, Ks stands for the constant corresponding to the tread rigidity, λ stands for the lateral slip (λ=tan (α)), and, α stands for the slip angle.

Generally, it is considered that $\lambda$ is equal to $\alpha$ (i.e., $\lambda=\alpha$) because the slip angle $\alpha$ is small in the region where $\xi$ is greater than zero. As shown in Formula 1, because the maximum value of the side force is $\mu \cdot Fz$, provided that the ratio relative to the maximum value of the side force in accordance with the coefficient $\mu$ of friction on road is determined as road surface friction utilization ratio $\eta$, the road surface friction utilization ratio is calculated as $\eta=1-\xi^3$. Accordingly, $\epsilon m=1-\eta$ corresponds to the percentage of allowance for road surface friction. Provided that $\epsilon m$ corresponds to the wheel grip factor, the following formula is established: $\epsilon m=\xi^3$. In light of the foregoing, Formula 3 is expressed as the following.

$$Tsaa=(I \cdot Ks/6) \cdot \alpha \cdot \epsilon m \qquad \text{[Formula 5]}$$

Formula 5 shows that the aligning torque Tsaa is proportional to the slip angle $\alpha$ and the wheel grip factor $\epsilon m$. Provided that the characteristics at the wheel grip factor $\epsilon m=1$ (i.e., the road surface friction utilization ratio is zero, that is the percentage of allowance for the friction is one (1)) is determined as the reference aligning torque characteristics, the following formula is established.

$$Tsau=(I \cdot Ks/6) \cdot \alpha \qquad \text{[Formula 6]}$$

Based on Formula 5 and Formula 6, the wheel grip factor $\epsilon m$ is obtained as the following formula.

$$\epsilon m=Tsaa/Tsau \qquad \text{[Formula 7]}$$

As explained from that the coefficient $\mu$ of friction on road is not included in Formula 7 as the parameter, the wheel grip factor $\epsilon m$ can be calculated without using the coefficient $\mu$ of friction on road. In this case, the gradient K4 ($=I \cdot Ks/6$) of the reference aligning torque Tsau may be predetermined using the brush model or may be experimentally obtained. Further, the detection precision can be improved by determining the initial value first, identifying the gradient of the aligning torque in the vicinity of zero of the vehicle slip angle during the traveling, and by correcting.

Figure 29:
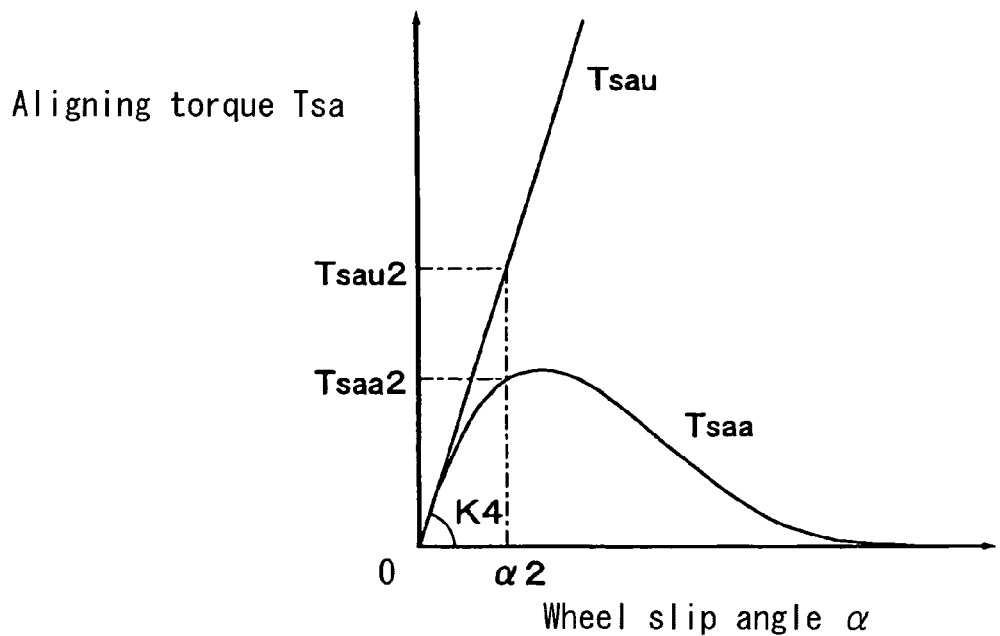
FIG. 29 is a graph showing the relationship of the aligning torque relative to the slip angle according to the embodiments of the present invention.

For example, in case the vehicle slip angle is at $\alpha 2$ in FIG. 29, the reference aligning torque is calculated as Tsau2=K4·$\alpha 2$. The vehicle grip degree $\epsilon m$ is obtained as $\epsilon m=Ysaa2/Tsau2=Tsaa2/(K4 \cdot \alpha 2)$.

Figure 30:
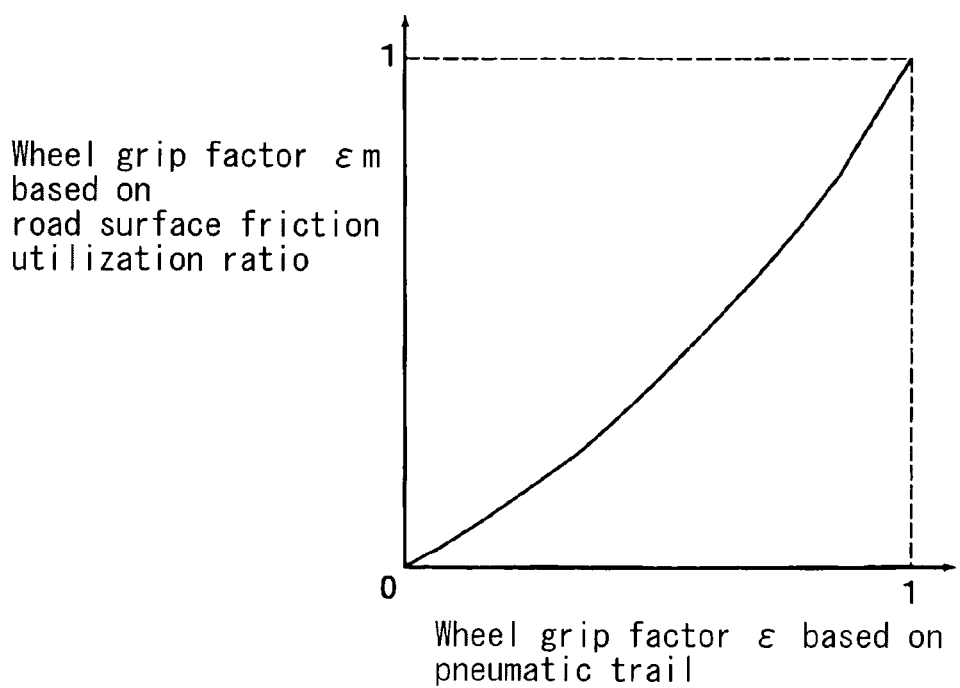
FIG. 30 is a graph showing the relationship between a wheel grip factor ∈ based on the pneumatic trail and the wheel grip factor ∈m based on the lateral grip margin of the road surface friction according to the embodiments of the present invention.

Accordingly, in place of the vehicle grip degree $\epsilon m$ based on the pneumatic trail, the vehicle grip degree $\epsilon m$ based on the percentage of allowance for the road surface friction is used. The wheel grip factor $\epsilon$ based on the pneumatic trail and the wheel grip factor $\epsilon m$ based on the road surface friction utilization ratio have the relationship as shown in FIG. 30. Accordingly, the wheel grip factor $\epsilon$ may be obtained to convert into the wheel grip factor $\epsilon m$, or the wheel grip factor $\epsilon m$ may be converted into the wheel grip factor $\epsilon$.

Figure 31:
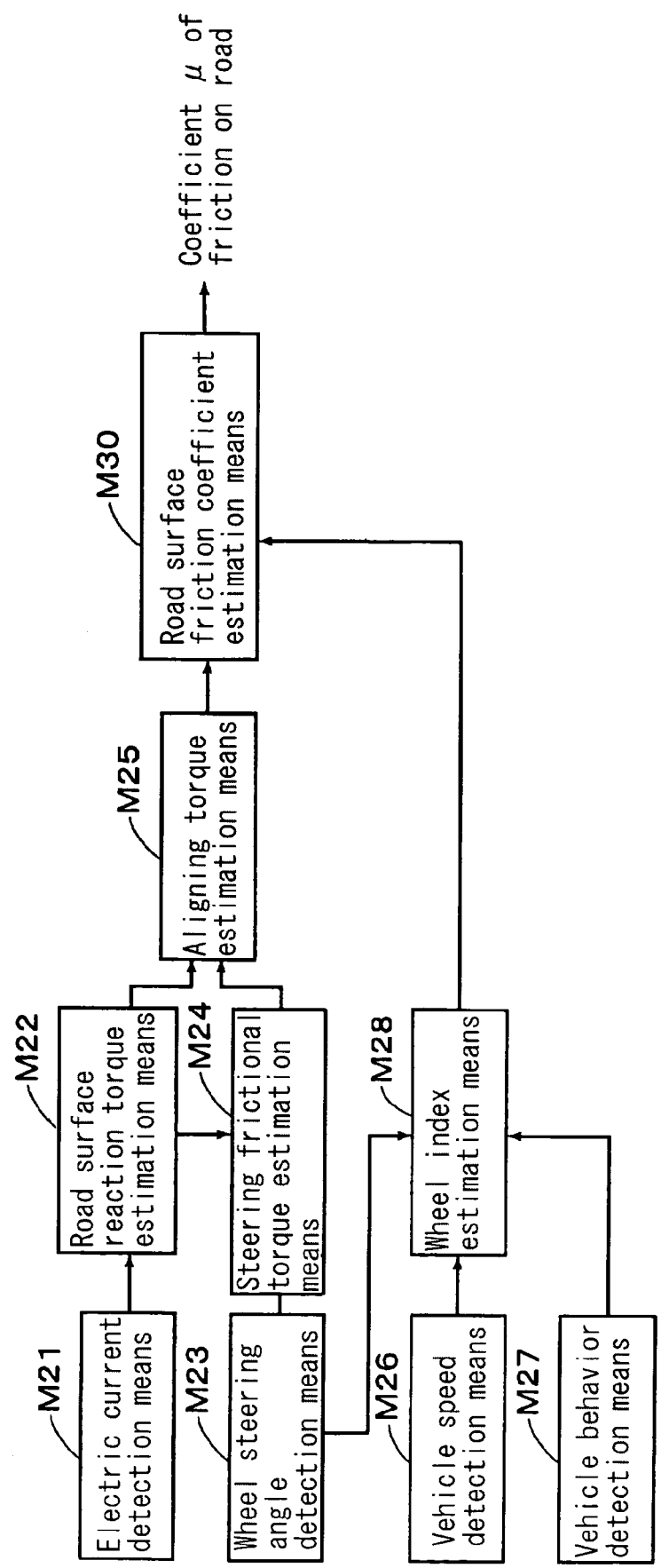
FIG. 31 is a block view showing an example of an estimation of the coefficient friction on a road according to the embodiments of the present invention.

A method for estimating the coefficient $\mu$ of friction on road from the wheel index expressed with the side force or the slip angle and the aligning torque will be explained as follows. FIG. 31 shows an example of the estimation of the coefficient of friction on road. Through block M21-M25, likewise the estimation of the vehicle wheel grip shown in FIG. 16, the road surface reaction force torque is calculated from the motor electric current and the steering system friction torque is corrected to calculate the aligning torque based thereon. The wheel index obtained through M26-M28 is obtained likewise the means shown in FIGS. 26-28. At a road surface friction coefficient estimation means 30, the coefficient $\mu$ of the friction on road is obtained based on the relationship between the wheel index and the aligning torque.

Figure 32:
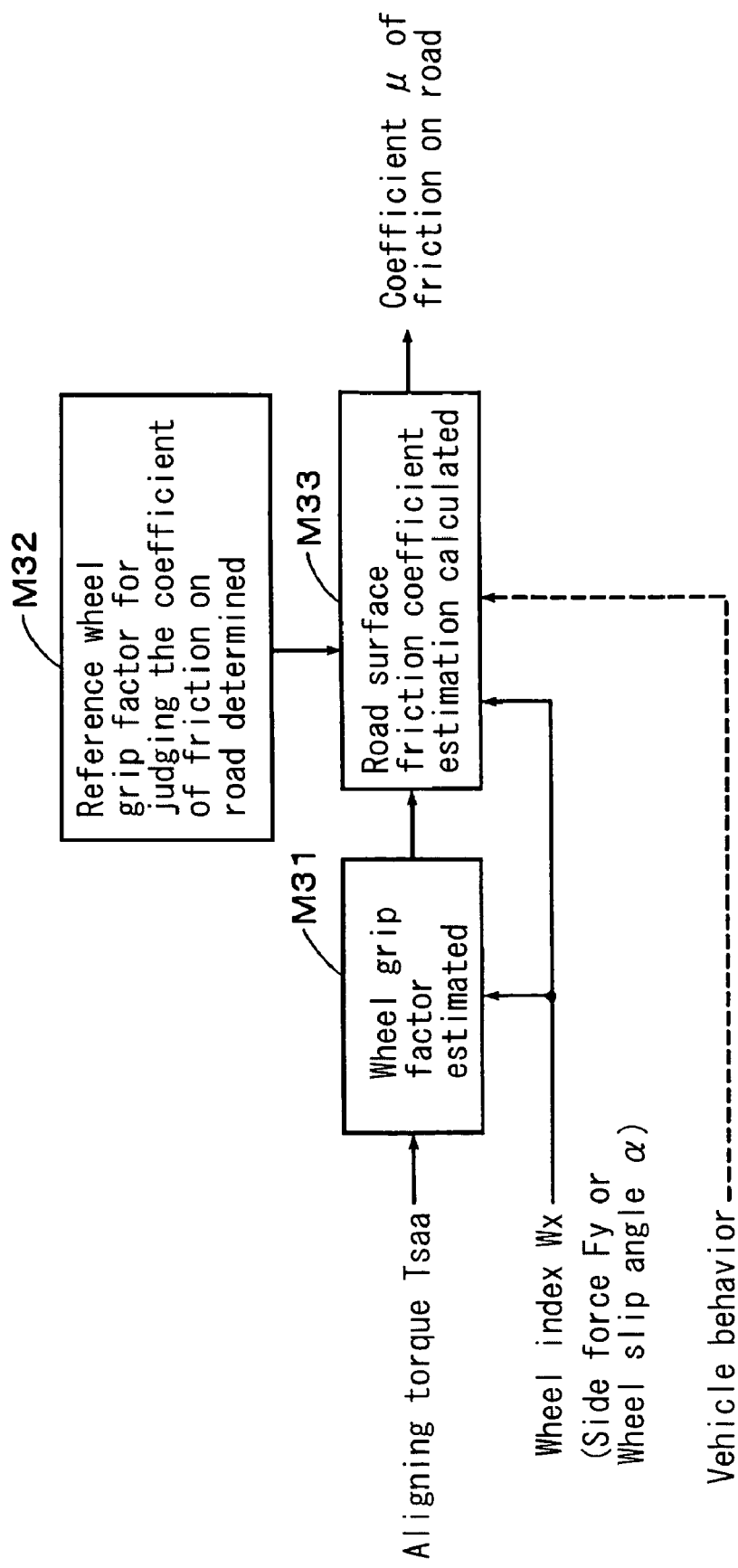
FIG. 32 is a block view showing an example of the estimation of the coefficient of friction on road based on the wheel index and the aligning torque according to the embodiments of the present invention.

FIG. 32 shows an example for estimating the coefficient of friction on road based on the wheel index estimated at the wheel index estimation means M28 and the aligning torque estimated at the aligning torque estimation means M25 at the road surface friction coefficient estimation means 30. First, at block M31, as shown in FIGS. 16-23, the wheel grip factor $\epsilon$ is estimated from the aligning torque Tsa and the wheel index Wx. At block M33 for performing the road surface friction coefficient estimation calculation, the coefficient $\mu$ of friction on road is estimated from the aligning torque or the wheel index when reaching a predetermined reference wheel grip factor determined at a reference wheel grip factor setting block M32 for judging the coefficient of friction on road. Because the wheel index reflects in the vehicle behavior, in place of the value of the wheel index, the coefficient $\mu$ of friction on road may be estimated using the value of the vehicle behavior when reaching the reference wheel grip factor, that is, the lateral acceleration or the yaw rate.

Figure 33:
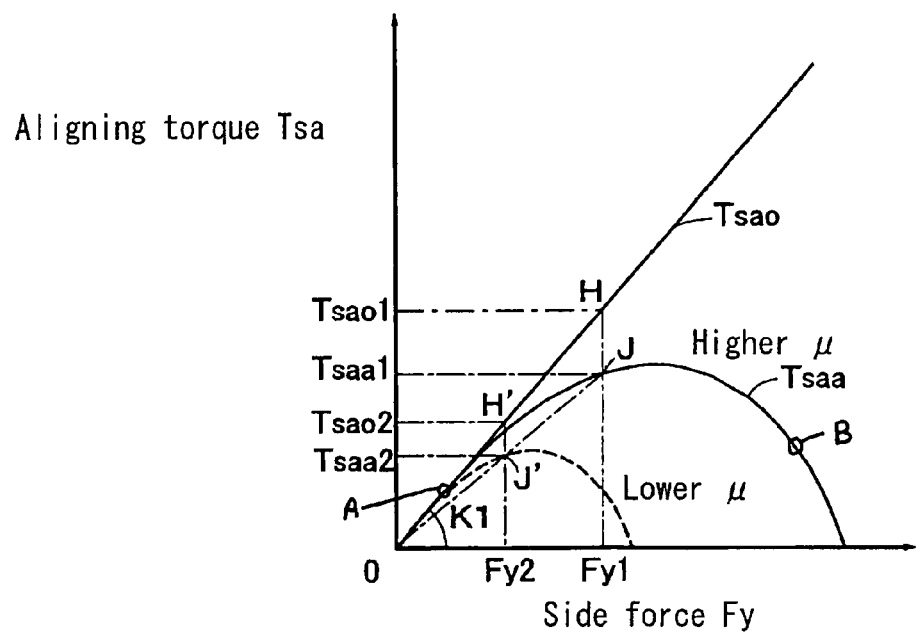
FIG. 33 is a graph showing an example for estimating the coefficient of friction on road with the side force as the wheel index according to the embodiments of the present invention.

An example for estimating the coefficient $\mu$ of friction on road by determining the side force Fy as the wheel index Wx will be explained with reference to FIG. 33. FIG. 33 shows the relationship between the side force Fy and the aligning torque Tsa when the coefficient $\mu$ of friction on road is changed. The solid line shows the characteristics of the higher $\mu$ and the dotted line show the characteristics of the lower $\mu$. In case the configuration of the surface of the vehicle wheel contacting the road and the elasticity of the tread rubber are constant, the side force-aligning torque characteristics assumes similar figures relative to the level of the coefficient $\mu$ of friction on road (i.e., the characteristics of the solid line and the dotted line of FIG. 33). Thus, the value of the side force Fy or the aligning torque Tsa is reflecting the coefficient $\mu$ of friction on road directly when the wheel grip factor $\epsilon$, obtained from the ratio of the reference aligning torque to the actual aligning torque, is the same.

Accordingly, as shown in FIG. 33, because the wheel grip factor $\epsilon$ at the higher $\mu$ is $\epsilon$=line segment [J-Fy1]/line segment [H-Fy1], the wheel grip factor $\epsilon'$ at the low $\mu$ is $\epsilon'$=line segment [J'-Fy2]/line segment [H'-Fy2], and a triangle [0-H-Fy1] and a triangle [0-H'-Fy2] are similar figures, in case of $\epsilon=\epsilon'$, the ratio of line segment [0-F1] and line segment [0-Fy2], that is, the ratio of the side force Fy1 to the side force Fy2, or the ratio of line segment [J-Fy1] to line segment [J-Fy2], that is, the ratio of the aligning torque Tsaa1 to the aligning torque Tsaa2 shows the ratio of coefficient $\mu$ of friction on road. Accordingly, for example, using a predetermined wheel grip factor as a reference at a dried asphalt road surface ($\mu$ is approximately 1.0), the coefficient $\mu$ of friction on road can be estimated based on the value of the side force Fy or the aligning torque Tsa at the predetermined wheel grip factor. In other words, the coefficient of friction on road can be estimated from the value of the side force (Fy1, Fy2) or the value of the aligning torque (Tsaa1, Tsaa2) when reaching the reference wheel grip factor (i.e., point J and J') at FIG. 33.

Figure 34:
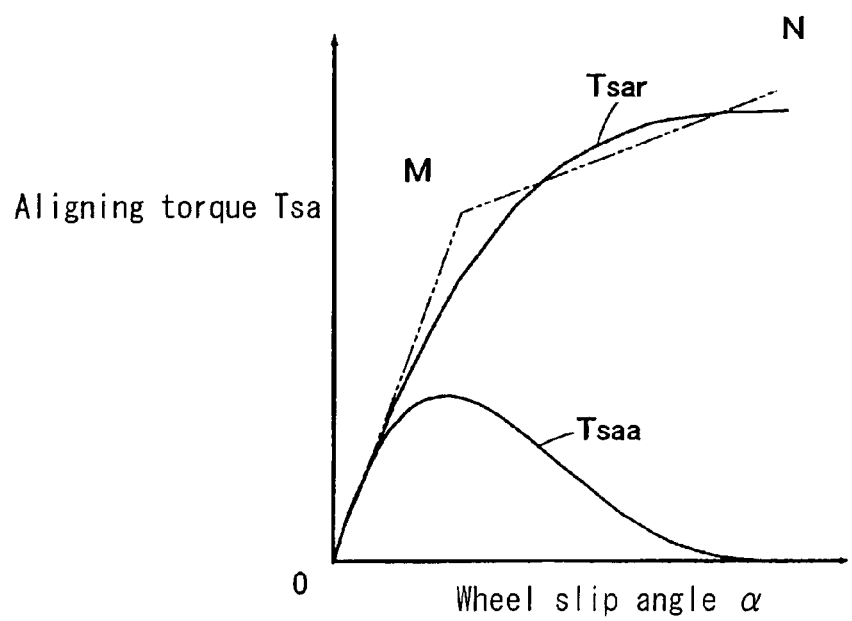
FIG. 34 is a graph showing an example for estimating the coefficient of friction on road with the slip angle as the wheel index according to the embodiments of the present invention.

Likewise, the coefficient $\mu$ of friction on road can be estimated by determining the slip angle $\alpha$ as the wheel index Wx. As shown in FIG. 34, likewise the estimation of the wheel grip factor, the aligning torque Tsa assumes to have the nonlinear characteristics relative to the slip angle $\alpha$. Thus, the coefficient $\mu$ of friction on road is estimated at the linear region (i.e., 0-M region) relative to the slip angle $\alpha$ by approximating the slip angle-aligning torque characteristics to a straight line of as shown with two dotted line of FIG. 34.

Figure 35:
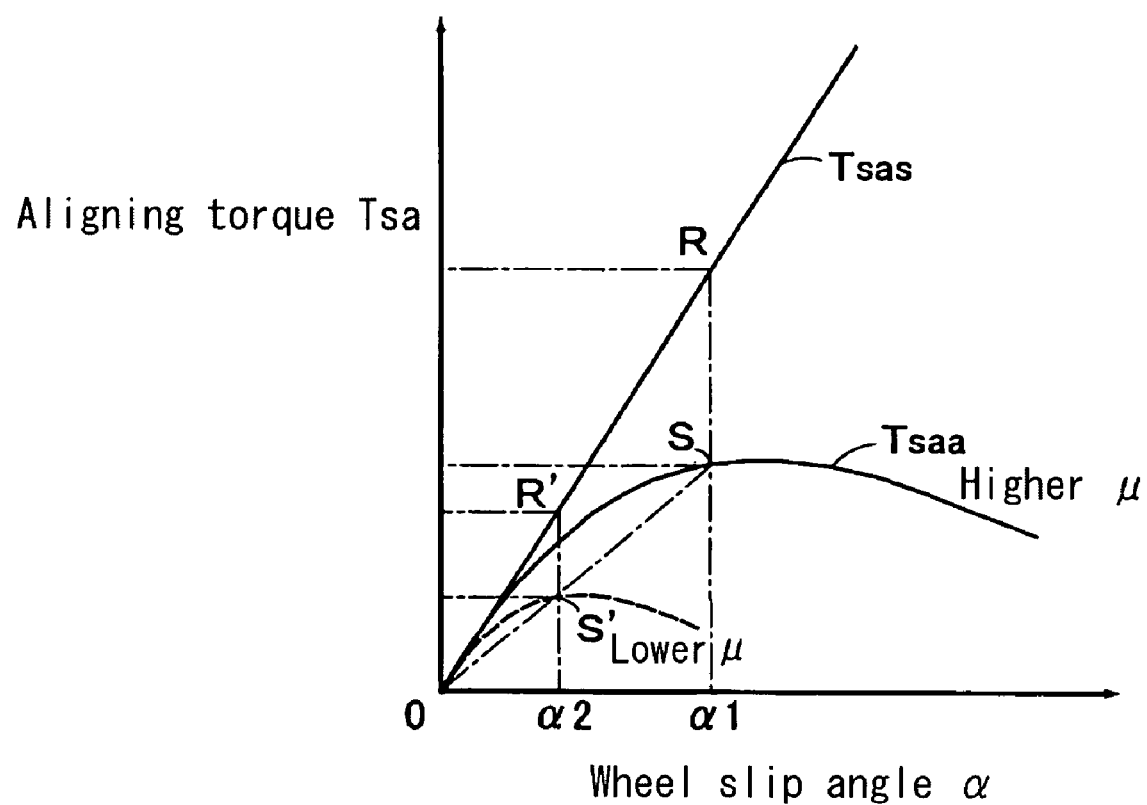
FIG. 35 is a graph showing the relationship between the slip angle and the aligning torque according to the embodiments of the present invention.

FIG. 35 shows the relationship of the slip angle $\alpha$ and the aligning torque Tsa likewise in FIG. 34. The solid line shows the higher coefficient $\mu$ of friction on road and a dotted line shows the lower coefficient $\mu$ of friction on road. As shown in FIG. 35, the slip angle-aligning torque characteristics assumes similar figures (i.e., the characteristics of the solid line and the dotted line of FIG. 35) relative to the coefficient μ of friction on road likewise in FIG. 33. Accordingly, the coefficient of friction on road can be estimated from the value (α1, α2) of the slip angle or the value of the aligning torque when reaching the predetermined reference wheel grip factor (i.e., point S and S' of FIG. 35). In this case, the reference wheel grip factor is necessary to be determined within a region in which the relationship between the slip angle and the side force is at linear state. In order to detect the variation of the coefficient of friction on road with high sensitivity, it is required to be detected in the region to be nonlinear at the slip angle-aligning torque characteristics, that is the region where a predetermined difference is generated between the reference aligning torque and the actual aligning torque. In light of the foregoing, it is preferable to determine the reference wheel grip factor experimentally, having the case with the higher coefficient of friction on road of the dried asphalt road surface, or the like as a standard.

With the estimation of the coefficient of friction on road based on the wheel grip factor, in place of the wheel grip factor ε based on the pneumatic trail, the wheel grip factor εm based on the percentage of allowance for the friction of road may be applied. Because the wheel grip factor ε and the wheel grip factor εm have the relationship as shown in FIG. 30, the wheel grip factor ε may be obtained to be converted into the wheel grip factor εm and vice versa.

With the steer-by-wire-system, accordingly, the wheel grip factor and the frictional coefficient can be easily estimated. With the construction in which the steering means for the operator and the wheels to be steered are mechanically connected, as shown in FIG. 1, it is necessary to separately detect the torque generated by the steering assisting device (i.e., electric power steering system EPS) and the torque generated by the operation by the operator. On the other hand, with the construction of the steer-by-wire system, because the output torque of the driving means (i.e., motor) and the reaction force torque that the vehicle wheel receives from the road surface are approximately corresponding to each other, the driving means can be used as a sensor for estimating the state of the road surface. Further, because the output torque can be obtained by detecting the driving electric current of the motor, the road surface state including the friction coefficient and the wheel grip factor can be easily estimated, which reduces the manufacturing cost.

According to the embodiment of the present invention, the frictional state between the road surface and the wheels (i.e., tires) can be accurately recognized by estimating the grip state of the vehicle wheel to perform the appropriate roll control in accordance with the vehicle state.

According to the embodiment of the present invention, the traveling road surface of the vehicle can be estimated as the wheel grip factor with high precision at an appropriate timing.

According to the embodiment of the present invention, by providing the reference aligning torque setting means, the wheel grip factor can be estimated easily and with high precision based on the comparison result between the reference aligning torque and the aligning torque estimated at the aligning torque estimation means.

According to the embodiment of the present invention, the road surface state can be estimated at the appropriate timing with high precision with the steer-by-wire-system vehicle, and the appropriate roll control can be performed based on the road surface state. The frictional coefficient can be estimated with high precision and easily based on the wheel grip factor, the control parameter is appropriately determined based on the estimated wheel grip factor, and the roll control can be appropriately performed in accordance with the control parameter.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A suspension control device comprising:
 a wheel grip state estimation means for estimating a grip state of vehicle wheels based on variations of aligning torque of wheels to be steered, the grip state representing the degree of a lateral force that tires of the vehicle wheels generate relative to the maximum degree of the lateral force that the tires generate with a percentage of allowance to a limit;
 aligning torque estimation means for estimating the aligning torque on the basis of a pneumatic trail;
 a vehicle rolling control means for controlling vehicle rolling; and
 a control parameter setting means for setting a control parameter of the vehicle rolling control means based on at least estimated grip state of the wheel grip state estimation means.

2. The suspension control device according to claim 1, further comprising:
 a vehicle roll stiffness control means for controlling vehicle roll stiffness for restraining vehicle rolling; and
 wherein the control parameter setting means sets a control parameter of the vehicle roll stiffness control means based on at least estimated grip state of the wheel grip estimation means.

3. The suspension control device according to claim 2, wherein the wheel grip state estimation means comprises an aligning torque estimation means for estimating aligning torque generated at the wheels, a vehicle state amount detection means for detecting state amount of the vehicle, a wheel index estimation means for estimating at least one of wheel indexes including side force and a wheel slip angle relative to the wheel, and a wheel grip factor estimation means for estimating wheel grip factor relative to the wheels based on the variations of the aligning torque estimated by the aligning torque estimation means.

4. The suspension control device according to claim 3, wherein the wheel grip state estimation means includes a reference aligning torque setting means for setting reference aligning torque based on the wheel index estimated by the wheel index estimation means and the aligning torque estimated by the aligning torque estimation means, and the wheel grip factor estimation means estimate the wheel grip factor relative to the wheels based on comparison result of the reference aligning torque determined by the reference aligning torque setting means and the aligning torque estimated by the aligning torque estimation means.

5. The suspension control device according to claim 4, further comprising:
 a driving means for conducting steering control of the vehicle, the driving means being mechanically separated from an operation means for an operator; and a driving signal detection means for detecting driving signal of the driving means under steering control by the driving means; wherein the aligning torque estimation means estimates the aligning torque based on detected result by the driving signal detection means.

6. The suspension control device according to claim 3, further comprising:

a driving means for conducting steering control of the vehicle, the driving means being mechanically separated from an operation means for an operator; and a driving signal detection means for detecting driving signal of the driving means under steering control by the driving means; wherein the aligning torque estimation means estimates the aligning torque based on detected result by the driving signal detection means.

7. The suspension control device according to claim 2, further comprising:

a frictional coefficient estimation means for estimating a frictional coefficient of the vehicle relative to a road surface based on the wheel grip factor estimated by the wheel grip factor estimation means; wherein the control parameter setting means determines the control parameter at least based on the frictional coefficient estimated by the frictional coefficient estimation means.

8. The suspension control device according to claim 1, further comprising:

a vehicle roll stiffness distribution control means for controlling vehicle roll stiffness distribution for controlling vehicle steering characteristics; and wherein the control parameter setting means sets a control parameter of the vehicle roll stiffness distribution control means based on at least estimated grip state of the wheel grip estimation means.

9. The suspension control device according to claim 8, wherein the wheel grip state estimation means comprises an aligning torque estimation means for estimating aligning torque generated at the wheels, a vehicle state amount detection means for detecting state amount of the vehicle, a wheel index estimation means for estimating at least one of wheel indexes including side force and a wheel slip angle relative to the wheel, and a wheel grip factor estimation means for estimating wheel grip factor relative to the wheels based on the variations of the aligning torque estimated by the aligning torque estimation means.

10. The suspension control device according to claim 9, wherein the wheel grip state estimation means includes a reference aligning torque setting means for setting reference aligning torque based on the wheel index estimated by the wheel index estimation means and the aligning torque estimated by the aligning torque estimation means, and the wheel grip factor estimation means estimate the wheel grip factor relative to the wheels based on comparison result of the reference aligning torque determined by the reference aligning torque setting means and the aligning torque estimated by the aligning torque estimation means.

11. The suspension control device according to claim 10, further comprising:

a driving means for conducting steering control of the vehicle, the driving means being mechanically separated from an operation means for an operator; and a driving signal detection means for detecting driving signal of the driving means under steering control by the driving means; wherein the aligning torque estimation means estimates the aligning torque based on detected result by the driving signal detection means.

12. The suspension control device according to claim 9, further comprising:

a driving means for conducting steering control of the vehicle, the driving means being mechanically separated from an operation means for an operator; and a driving signal detection means for detecting driving signal of the driving means under steering control by the driving means; wherein the aligning torque estimation means estimates the aligning torque based on detected result by the driving signal detection means.

13. The suspension control device according to claim 8, further comprising:

a frictional coefficient estimation means for estimating a frictional coefficient of the vehicle relative to a road surface based on the wheel grip factor estimated by the wheel grip factor estimation means; wherein the control parameter setting means determines the control parameter at least based on the frictional coefficient estimated by the frictional coefficient estimation means.

14. The suspension control device according to claim 1, wherein the wheel grip state estimation means comprises an aligning torque estimation means for estimating aligning torque generated at wheels, a vehicle state amount detection means for detecting state amount of the vehicle, a wheel index estimation means for estimating at least one of wheel indexes including side force and a wheel slip angle relative to the wheel, and a wheel grip factor estimation means for estimating wheel grip factor relative to the wheels based on the variations of the aligning torque estimated by the aligning torque estimation means.

15. The suspension control device according to claim 14, further comprising:

a driving means for conducting steering control of the vehicle, the driving means being mechanically separated from an operation means for an operator; and a driving signal detection means for detecting driving signal of the driving means under steering control by the driving means; wherein the aligning torque estimation means estimates the aligning torque based on detected result by the driving signal detection means.

16. The suspension control device according to claim 14, wherein the wheel grip state estimation means includes a reference aligning torque setting means for setting reference aligning torque based on the wheel index estimated by the wheel index estimation means and the aligning torque estimated by the aligning torque estimation means, and the wheel grip factor estimation means estimate the wheel grip factor relative to the wheels based on comparison result of the reference aligning torque determined by the reference aligning torque setting means and the aligning torque estimated by the aligning torque estimation means.

17. The suspension control device according to claim 16, further comprising:

a driving means for conducting steering control of the vehicle, the driving means being mechanically separated from an operation means for an operator; and a driving signal detection means for detecting driving signal of the driving means under steering control by the driving means; wherein the aligning torque estimation means estimates the aligning torque based on detected result by the driving signal detection means.

18. The suspension control device according to claim 1, further comprising:
a frictional coefficient estimation means for estimating a frictional coefficient of the vehicle relative to a road surface based on the wheel grip factor estimated by the wheel grip factor estimation means; wherein
the control parameter setting means determines the control parameter at least based on the frictional coefficient estimated by the frictional coefficient estimation means.

19. The suspension control device according to claim 1, wherein the vehicle rolling control means controlling vehicle roll stiffness for restraining vehicle rolling.

20. The suspension control device according to claim 1, wherein the vehicle rolling control means controlling vehicle roll stiffness distribution for controlling vehicle steering characteristics.

21. The suspension control device according to claim 1, wherein the aligning torque comprises a reference aligning torque and an actual aligning torque, and the aligning torque estimation means estimates the reference aligning torque.

* * * * *